Aug. 19, 1969  R. L. EVERY ET AL  3,462,353
REFERENCE ELECTRODES OF PARTICULAR UTILITY IN ANODIC
CORROSION PROTECTION SYSTEMS
Filed March 2, 1966  10 Sheets-Sheet 1

INVENTORS
RICHARD L. EVERY &
WILLIAM R. BANKS
BY
Carl A. Cline
AGENT

INVENTORS
RICHARD L. EVERY &
WILLIAM R BANKS
BY
Carl A. Cline
AGENT

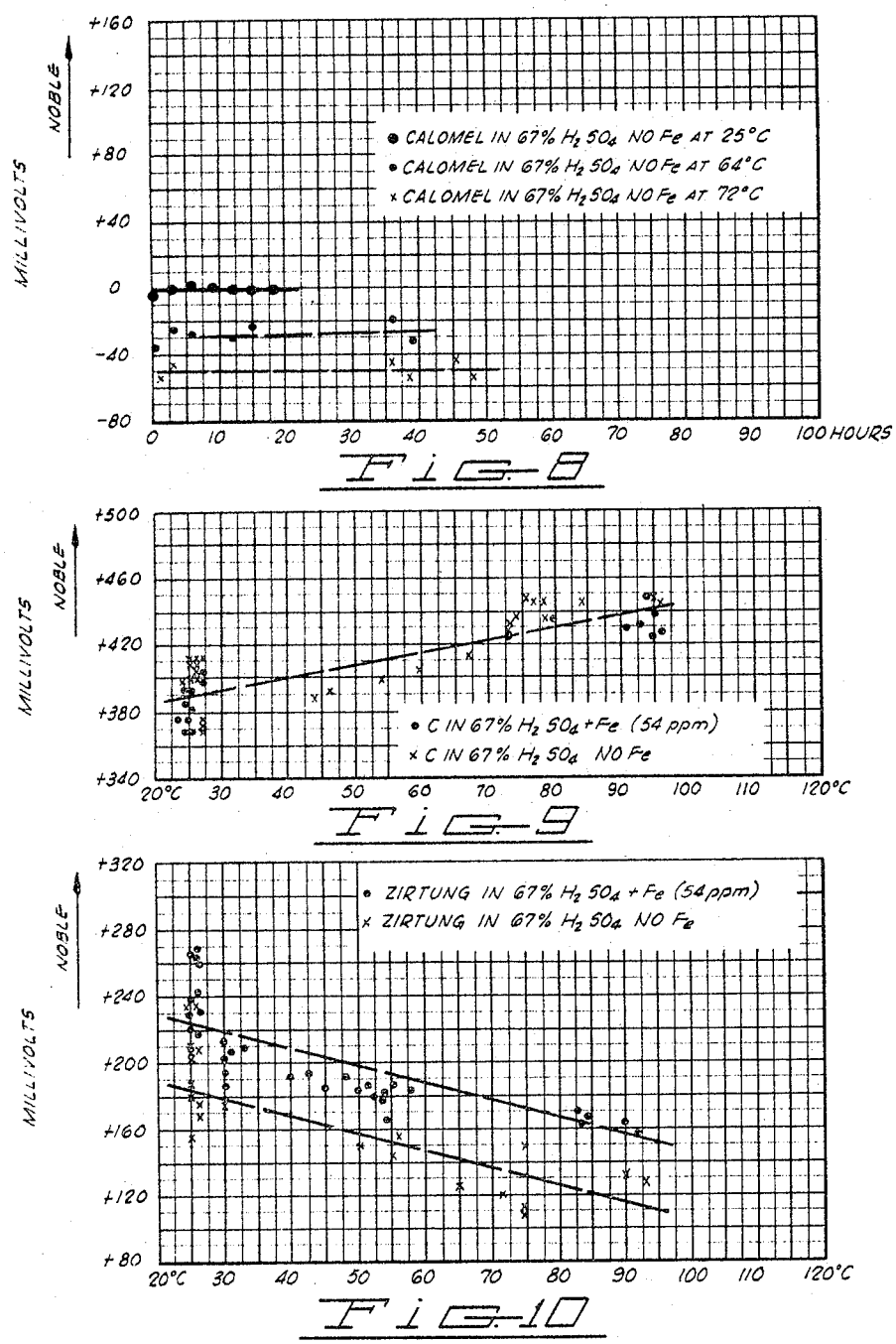

INVENTORS
RICHARD L. EVERY &
WILLIAM R. BANKS
BY Carl A. Cline
AGENT

INVENTORS
RICHARD L. EVERY &
WILLIAM P. BANKS
BY Carl A. Cline
AGENT

INVENTORS
RICHARD L. EVERY &
WILLIAM P. BANKS
BY
Carl A. Cline
AGENT

INVENTORS
RICHARD L. EVERY &
WILLIAM R. BANKS
BY
William A. Mikesell
ATTORNEY

United States Patent Office 3,462,353
Patented Aug. 19, 1969

3,462,353
REFERENCE ELECTRODES OF PARTICULAR UTILITY IN ANODIC CORROSION PROTECTION SYSTEMS
Richard L. Every and William P. Banks, Ponca City, Okla., assignors to Continental Oil Company, Ponca City, Okla., a corporation of Delaware
Continuation-in-part of application Ser. No. 368,956, May 20, 1964. This application Mar. 2, 1966, Ser. No. 541,875
Int. Cl. C23f 13/00; B01k 3/02
U.S. Cl. 204—147                 2 Claims

ABSTRACT OF THE DISCLOSURE

This invention comprises an anodic polarization system wherein a reference electrode, preferably a metal-metal oxide electrode, is immersed in a corrosive electrolytic solution and is in direct electrical communication with said electrolytic solution.

---

The application is a continuation-in-part of application for United States Letters Patent Ser. No. 368,956 filed May 20, 1964, now abandoned, which was a continuation-in-part of application for United States Letters Patent Ser. No. 260,804 filed Feb. 25, 1963, now abandoned. The invention relates to the use of reference electrodes or half-cells to provide a known reference potential with respect to the electrolyte in which they are immersed, against which the electrical potential of a metal in contact with the electrolyte is measured. More particularly, this invention relates to new reference electrodes and to their use to determine the susceptibility of metal to corrosive attack in anodic polarization systems for protecting metals which are in contact with certain corrosive electrolytic solutions.

It has been recognized by electrochemists that when a metal anode becomes polarized, corrosion sometimes ceases. Just how this occurs is not fully understood and the maintenance of a large metal object in this passive state in a corrosive electrolyte for an extended period of time has been achieved only very recently. An outgrowth of this achievement has been the development of a commercial apparatus and method for protecting industrial equipment from corrosion when in contact with corrosive electrolytes. In the systems now in commercial usage, corrosion protection is achieved by suspending an inert electrode in the corrosive electrolyte which is in contact with the metal vessel or other metallic object to be protected, making the inert electrode the cathode and the metal the anode in an electrical circuit, and passing a quantity of direct current between the metal and the inert electrode through the electrolyte to cause the metal to become passivated or nearly immune to corrosive attack by the electrolyte. When this state of the metal is achieved, the described passage of current may be discontinued or sharply reduced. The metal will then retain its passivity for a limited period of time, the duration of which will depend upon the particular metal, electrolyte, and temperatures which are involved.

As a metal varies in its susceptibility to corrosive attack, its electrical potential varies. Thus, if this potential is monitored, the state of passivity or nobility of the vessel can at all times be determined so that it may be shown at what times, and to what extent, current should be passed between the vessel and the cathode in order to retain the metal in its passive state. In the present state of development of anodic corrosion protection systems, the susceptibility of the metal to corrosion is monitored by intermittently or continuously measuring the potential difference between the metal and a reference electrode which is placed in electrical communication with the corrosive electrolyte by means of a suitable electrolytic bridge.

In order to initially establish the corrosion characteristics of a particular metal contacted by a particular electrolyte in terms of the metal's electrical potential, a polarization curve is first obtained in which the electromotive force (E.M.F.) between the reference electrode and the metal is plotted against the current required to maintain a fixed potential difference for a given period of time. Also a series of curves are obtained in which the loss in weight of the metal due to corrosion is plotted against the potential difference between the reference electrode and the vessel. These curves establish (a) that the metal may be protected, (b) the potential at which the metal should be held (in terms of the potential difference between the reference electrode and the metal), (c) the current required to establish passivity, (d) the current required to maintain passivity, and (e) the potential range in which it is possible to maintain protection. After these operating parameters have been established, the continuously determined values of the potential difference between the reference electrode and the metal to be protected may be fed into suitable control instrumentation for causing the necessary current to be passed between the metal and the inert cathode whenever the potential of the metal indicates this is required to maintain or restore the metal to a passive state.

From the discussion, thus far, it will be perceived that it is the function of the reference electrode to provide a half-cell of constant potential so that the potential of the metal to be protected in a given environment may be accurately known at all times. The effectiveness of the anodic polarization corrosion control system will depend upon the ability of the reference electrode to remain at a substantially constant, known potential under all operating conditions to which the system may be subjected, and to maintain this reference potential throughout the entire operating life of the system. Even a slight departure of the potential of the reference electrode can actually aggravate the corrosion problem by giving an erroneous indication of corrosive susceptibility of the metal and causing insufficient or excessive current to be passed to the metal from the inert cathode or by causing current to flow at the wrong times.

In the anodic polarization systems known by us to be in commercial use at the present time, two types of electrochemical half-cells are generally employed as the reference electrode. Of these, the most frequently used is the calomel half-cell, an electrode accepted as a standard and widely used in other applications by virtue of its relatively stable and constant potential. The other reference electrode which is used in the anodic polarization corrosion system is a silver-silver chloride electrode. The calomel electrode is a liquid electrode while the silver-silver chloride electrode is solid.

Although corrosion control systems employing these two types of reference electrodes to determine corrosion susceptibility have generally worked satisfactorily under certain preselected conditions, these electrodes lack universality with respect to the types of electrolytes in which they may be used, and each suffers from serious limitation when subjected to variations in the concentration of the electrolyte in which they are used, or to varying temperature conditions.

The silver-silver chloride half-cell is rather difficult to prepare properly and, because of its softness, presents some difficulty in mounting. The most serious shortcomings of this reference electrode, however, are its solubility in oleum, a frequently encountered electrolyte in such corrosion protection systems, and its susceptibility to severe erosion in highly agitated systems.

Although the calomel electrode is of more universal utility than the silver-silver chloride electrode, in several respects it presents serious disadvantages not shared by the silver-silver chloride electrode. For the most part, these stem from the fact that it is a liquid electrode. Thus, to prevent contamination of the electrode, a suitable electrochemical salt bridge must be utilized to provide a conductive path between the corrosive electrolyte and the calomel electrode. Not only are reference electrode assemblies employing such salt bridges difficult to install, but they also present a problem of contamination of the electrolyte product by the salt solution of the bridge. Moreover, where large tanks filled with a corrosive electrolytic chemical are to be protected, the salt bridge must be of considerable length, and for this reason, it is rather fragile and is therefore subject to mechanical malfunctioning, particularly in systems in which the corrosive electrolyte is violently agitated. Also, in product storage systems where the corrosive electrolyte is maintained under pressure, some means must be provided for equalizing the pressure acting upon the salt solution in the electrolytic bridge.

In addition to the problems stemming from the requirement of employing an electrolytic salt bridge in conjunction with a calomel reference electrode, other undesirable aspects are associated with the use of this electrode. One of these is the variation of its potential with temperature. This constitutes a severe limitation in systems where the corrosive electrolyte varies in temperature over a wide range. There is also some tendency toward fluctuation of the potential of the calomel electrode when the concentrations of some electrolytes in which it is used are varied considerably.

From the foregoing discussion of the types of reference electrodes now used for determining susceptibility to corrosive attack in anodic polarization corrosion control systems, it may be seen that an ideal reference electrode for this use must possess a number of characteristics, and that both of the described reference electrodes fail to possess several of these characteristics. The properties of the ideal reference electrode for use in anodic polarization corrosion control systems may be summarized as follows:

(a) Insolubility in any electrolyte in which it may be used and in any concentration of such electrolyte;

(b) Exhibits an electric potential which is essentially independent of electrolyte concentration and temperature;

(c) Does not require use of an electrolytic salt bridge;

(d) Can be fabricated in the form of a durable structure which will resist erosion, abrasion and impact.

Accordingly, it is a major object of the present invention to provide a method of determining the susceptibility of a metal to corrosive attack, utilizing reference electrodes with characteristics which more nearly approach the ideal properties set forth above.

A more specific object of the invention is to provide new reference electrodes for use in determining susceptibility of metals to corrosive attack, which electrodes may be installed and used in anodic polarization corrosion control systems by being placed directly in contact with the corrosive electrolyte and without requiring the use of a salt bridge.

A more specific object of the present invention is to provide a method for measuring the susceptibility of a metal to attack by corrosive electrolytes, which method yields stable, reliable measurements in spite of fluctuations in temperature, pH and concentration of the electrolytes.

It is also an object of this invention, by providing a more accurate and reliable method of measuring susceptibility to corrosive attack, to effect an improvement in the anodic polarization method of controlling corrosion of a metallic container by a corrosive electrolyte.

Another more specific object of the present invention is to provide methods for measuring susceptibility of a metal to corrosive attack, particularly for use in control of anodic polarization systems for preventing the corrosion of a metallic vessel by sulfuric acid, oleum, phosphoric or polyphosphoric acid contained therein, employing electrodes which display a relatively constant potential despite variations in the temperature and concentration of these corrosive materials.

Another more specific object of the present invention is to provide a method for measuring susceptibility of a metal to corrosive attack, particularly for use in control of anodic polarization systems for preventing the corrosion of a metallic vessel by a corrosive metal hydroxide contained therein, employing electrodes which display a relatively constant potential despite variations in the temperature and concentration of such bases.

Other objects and advantages of the invention will become apparent upon reading the description of the invention which follows.

The present invention contemplates the identification of a number of new reference electrodes suitable for use in anodic polarization corrosion control systems. In our investigations, we have not found any material which achieves "ideality" in its ability to function as a reference electrode. We have found, however, a number of electrode materials which are somewhat superior to both the calomel and silver-silver chloride half-cells which have previously been used as reference electrodes.

To summarize the novel and useful aspects of the invention, the process of the invention broadly comprises placing one of the reference electrodes of the invention in contact with a corrosive electrolyte of varying temperature or concentration, which electrolyte is also in contact with a metal, the corrosion susceptibility of which it is desired to determine, then measuring the potential difference between the metal and the reference electrode. Variations in this measured potential are indicative of a change in the passivity of the metal relative to corrosive attack by the electrolyte since the potential of the reference electrode used will, in each case, have been found to be essentially constant in the electrolyte.

In a more specific adaptation of the method of the invention, the reference electrodes of the invention are incorporated in anodic polarization corrosion control systems, and the system, as thereby improved, used to continuously avoid the corrosion of a metallic vessel which contains an electrolyte of varying temperature and/or concentration. The variation in the susceptibility of the vessel to corrosive attack is continuously monitored by the constant potential reference electrode, and the balance of the corrosion control system responds to such monitoring and institutes the necessary corrective action in the manner hereinbefore described.

In the case of some of the reference electrodes of the invention, the conditions of advantageous use are relatively nonlimiting, while in other instances, the respective electrode may be useful primarily in one or two types of corrosive electrolyte and over certain ranges of electrolyte temperature and concentration. Each of the reference electrodes of the invention presents a marked advantage over the calomel electrode in that no electrolytic salt bridge is required and the electrode may be placed in direct contact with the corrosive electrolyte. Also, the electrodes are, in general, more stable under varying temperature conditions than is the calomel electrode.

The types of reference electrodes employed in the present invention may be classified generically as consisting of an electrically conducting substance having a metallic character, separated from the liquid electrolyte by a body or film of a substance which is undissolved in the corrosive electrolyte. These reference electrodes may be classified more specifically according to whether the conductor possesses a metallic crystalline lattice or is a liquid metal. Of the latter group, it is believed that only one, a mercury-mercurous sulfate liquid electrode, has ever been used heretofore as a reference half-cell. However, it has usually been the practice to use this half-cell with an electrolytic salt bridge and in relatively weak or low concentration electrolytes. In any event, it has not been previously employed in anodic polarization corrosion control systems, and, as will be subsequently described, it presents several distinct advantages over the calomel electrode in addition to the elimination of the salt bridge requirement.

Although others of the electrodes of the invention have been heretofore known as electrodes per se, their use as electrodes has been confined to use as cathodes or anodes in various electrolytic systems wherein they were not required to function as a reference electrode having a constant potential under varying conditions of electrolyte temperature and concentration.

It is believed that at least two of the electrodes which we have fabricated are entirely new, having never been employed as electrodes in any way. These are the platinum-platinum oxide electrode and the rhodium-rhodium oxide electrode.

In a more restricted sense, the reference electrodes of the present invention may be divided into five categories, which classification is based primarily upon the electrode reaction mechanism which is involved. Thus, the mercury-mercurous sulfate, mercury-mercuric phosphate, mercury-mercuric oxide and mercury electrodes are not only liquid metal electrodes, but are metal-insoluble metal salt type electrodes. These electrodes are reversible to the anion of the insoluble salt. The mercury electrode may also be included in this category.

The solid electrodes include metal-insoluble metal oxide electrodes, such as gold-gold oxide, platinum-platinum oxide, rhodium-rhodium oxide and molybdenum-molybdenum oxide. This type of electrode is reversible to hydrogen ions and hydroxyl ions.

The solid electrodes also include certain elemental electrodes which appear to be inert and reflect only the potential developed by oxidation-reduction reactions occurring in the electrolyte with which they are in contact. The electrodes of this type which we have found suitable for use in anodic polarization corrosion control systems include gold and carbon.

Another group of solid electrodes found suitable for use as reference electrodes in corrosion control systems include elemental electrodes which display a relatively constant corrosion potential in the electrolyte in which they are used. This group includes tungsten, molybdenum, niobium and zirconium-tungsten alloy electrodes. In electrochemical terminology, electrodes of this type are frequently termed metal-metal ion electrodes and are said to be reversible to their own ions. However, under certain environmental conditions, these electrodes function in a manner similar to the inert electrodes discussed above.

Finally, we have found that chromium carbide and tungsten carbide electrodes function especially well as reference electrodes under some conditions of corrosion control. The nature of the reactions which occur at the contacting surfaces of these two electrodes is not fully understood. We therefore prefer to place them in a separate classification from the other electrodes.

The characteristics of the individual electrodes in various environments and the nature of the anodic system of corrosion prevention are disclosed herein with the aid of illustrative drawings and graphs, as outlined below.

Figure 7:
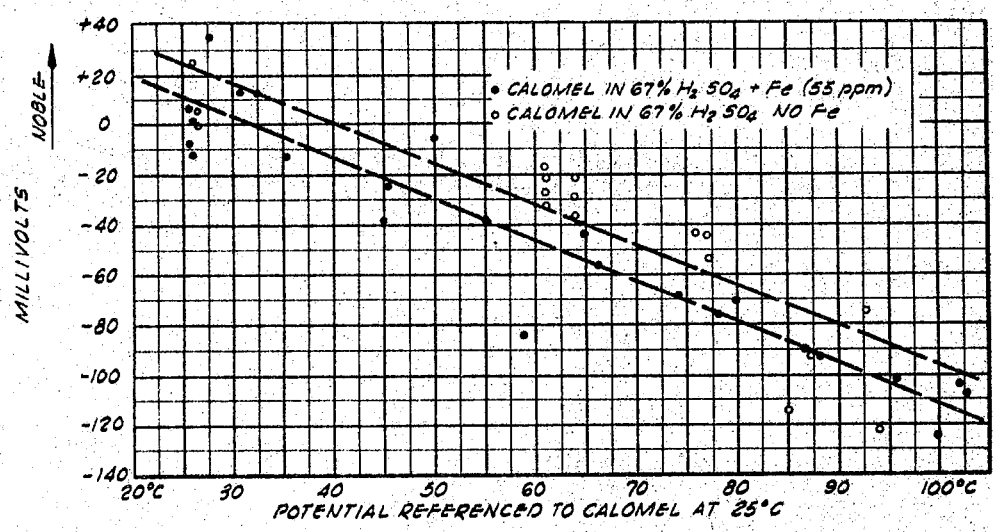

FIGURE 7 is a graph illustrating the effect of temperature variations upon the potential of a saturated calomel electrode in direct electrochemical contact with a sulfuric acid electrolyte. The graph illustrates the effect of temperature variations upon the potential of a calomel electrode in circumstances where the electrolyte contains appreciable quantities of iron also where the electrolyte is substantially iron free.

FIGURE 8 is a graph illustrating the potential stability of a calomel electrode over extended periods of time under varying conditions of electrolyte temperature.

FIGURE 9 is a graph illustrating the manner in which the potential of a carbon electrode contacting a sulfuric acid electrolyte varies with variations in the temperature of the electrolyte.

FIGURE 10 is a graph illustrating the manner in which the potential of a zirconium-tungsten alloy electrode varies with temperature in a sulfuric acid electrolyte. Two curves are plotted on the graph depicting the manner in which the potential of the electrode is affected over the temperature range employed both when the electrolyte contains iron as well as when no iron is contained in the electrolyte.

Figure 11:
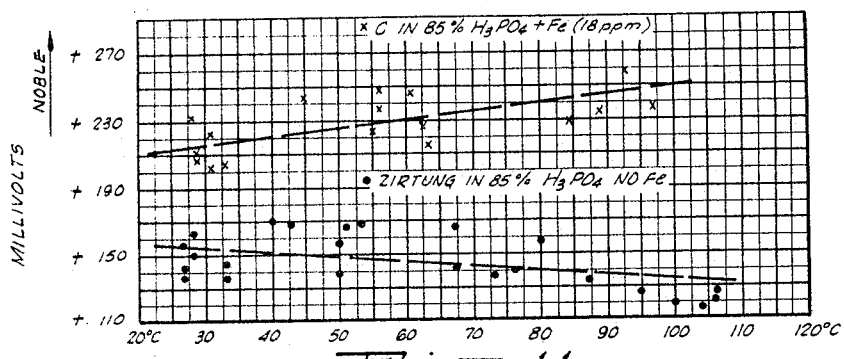

FIGURE 11 is a graph upon which the potentials of a zirconium-tungsten alloy electrode and also a carbon electrode are plotted against temperature when said electrodes are immersed in an 85% phosphoric acid solution. No iron is included in the acid solution contacting the alloy.

Figure 12:
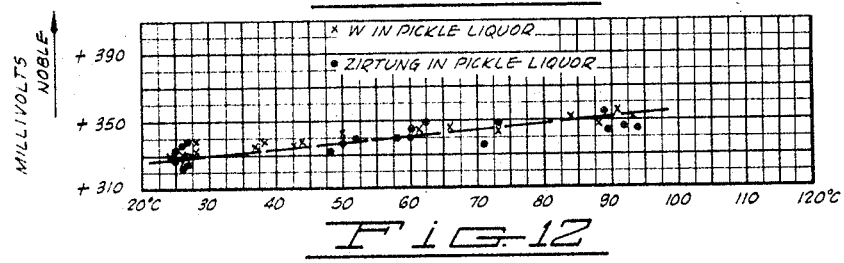

FIGURE 12 is a graph in which the potentials of a zirconium-tungsten alloy electrode and a pure tungsten metal electrode are plotted against temperature when sulfuric acid pickle liquor is the electrolyte employed.

Figure 13:
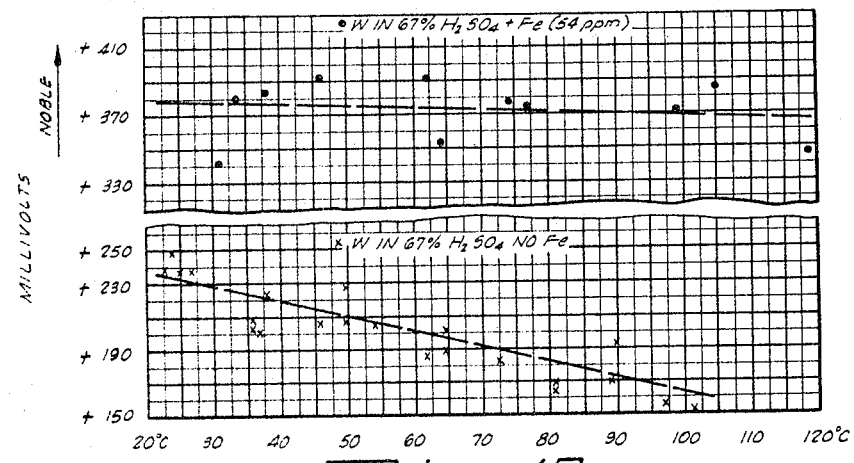

FIGURE 13 is a graph of the potentials obtained upon variation of electrolyte temperature for a tungsten electrode in contact with 67% sulfuric acid. One of the curves on the graph is the potential of the tungsten electrode when the acidic electrolyte contains iron and the other curve is the potential of the tungsten electrode when the electrolyte is free of iron.

Figure 14:
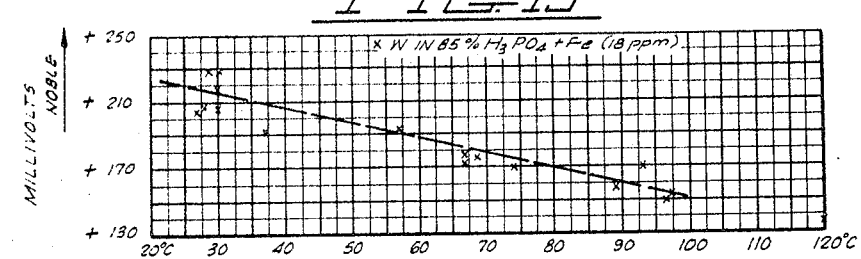

FIGURE 14 is a graph of potential against temperature for a tungsten electrode in direct contact with an 85% phosphoric acid electrolyte.

Figure 15:
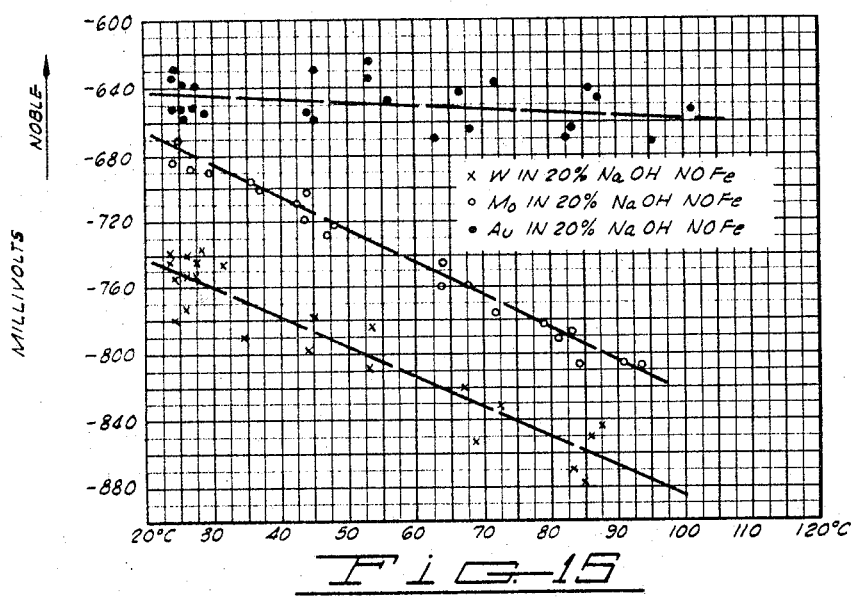

FIGURE 15 is a graph in which the potentials of three elemental metal electrodes are plotted against temperature while the electrodes are each immersed in a 20% sodium hydroxide electrolyte. The three electrodes are tungsten, gold and molybdenum.

Figure 16:
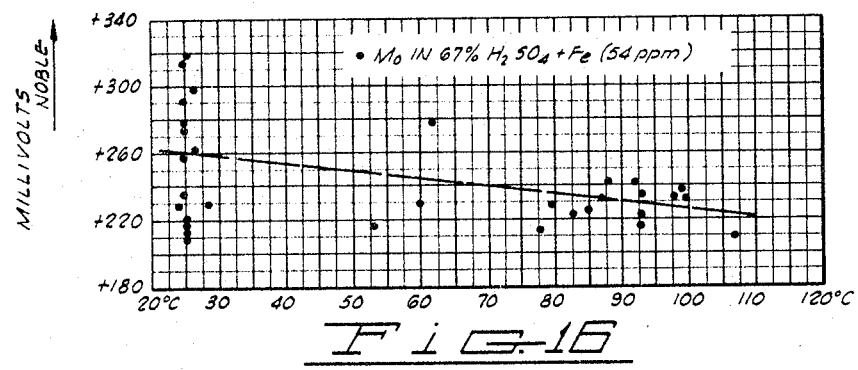

FIGURE 16 is a graph in which the potential of a molybdenum electrode in contact with a sulfuric acid electrolyte containing iron is plotted against temperature.

Figure 17:
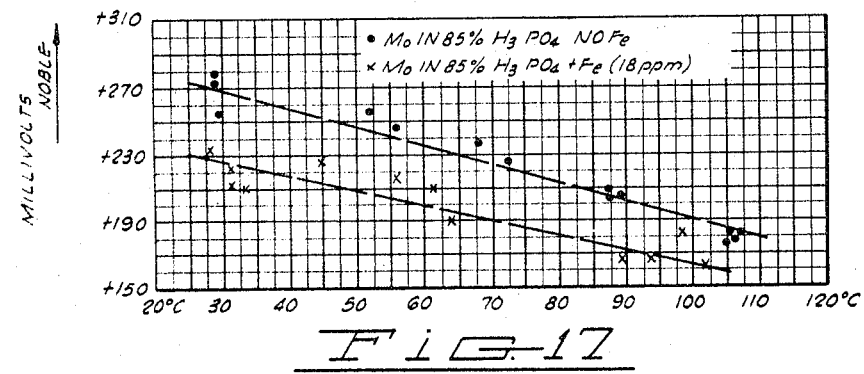

FIGURE 17 is a graph in which the potentials of molybdenum electrodes in two phosphoric acid electrolytes are plotted against temperature. One of the phosphoric acid solutions contains iron; the other does not.

Figure 18:
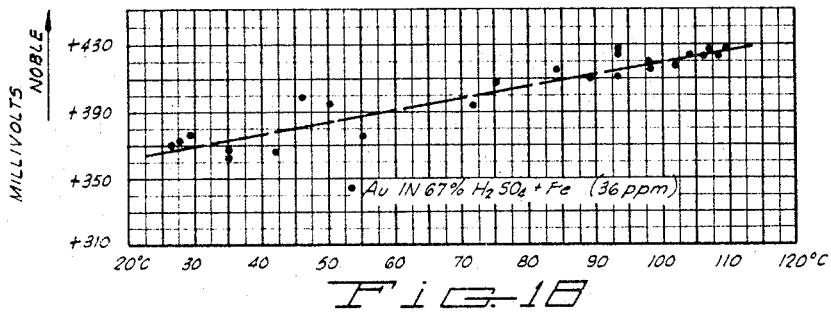

FIGURE 18 is a graph in which potential is plotted against temperature for a gold electrode in direct contact with 67% sulfuric acid containing iron.

Figure 19:
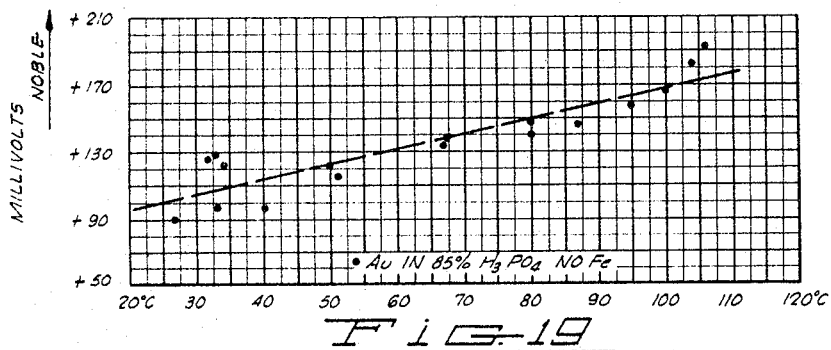

FIGURE 19 is a graph in which potential is plotted against temperature for a gold electrode in direct contact with 85% phosphoric acid.

Figure 20:
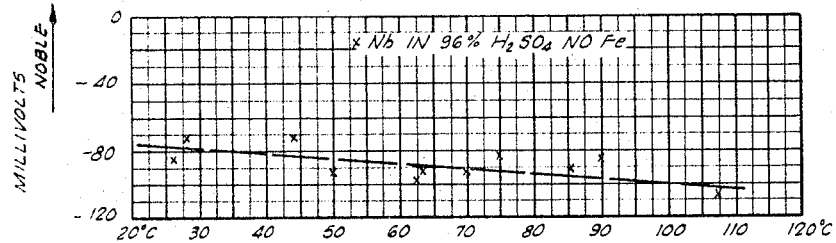

FIGURE 20 is a graph in which potential is plotted against temperature for a niobium electrode in direct contact with concentrated sulfuric acid containing no iron.

Figure 21:
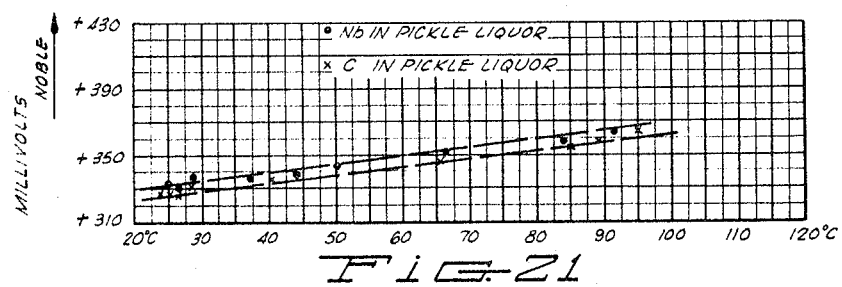

FIGURE 21 is a graph in which the potentials of niobium and carbon electrodes in direct contact with sulfuric acid pickle liquor are plotted against temperature.

Figure 22:
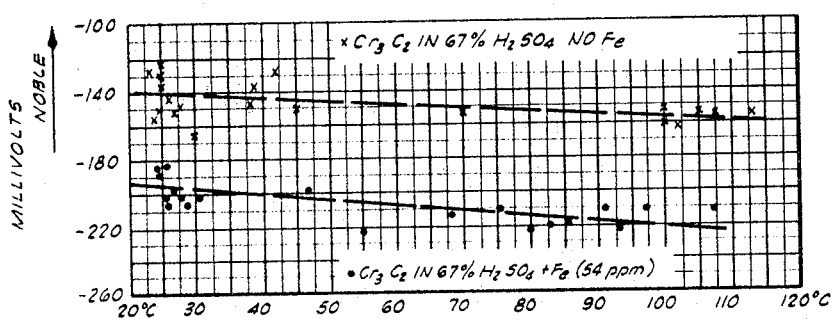

FIGURE 22 is a graph of potential against temperature for a chromium carbide electrode which is placed in contact with iron containing and non-iron containing concentrated sulfuric acid electrolyte.

Figure 23:
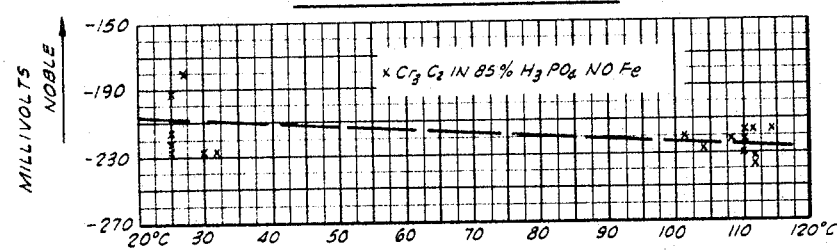

FIGURE 23 is a graph in which potential is plotted against temperature for a chromium carbide electrode in contact with a phosphoric acid electrolyte of 85% concentration.

Figure 24:
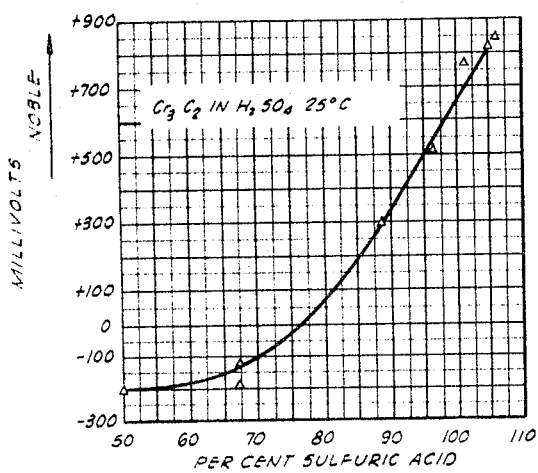

FIGURE 24 is a graph of potential against acid concentration for a chromium carbide electrode when said electrode is placed in direct contact with a sulfuric acid electrolyte of varying concentration.

Figure 25:
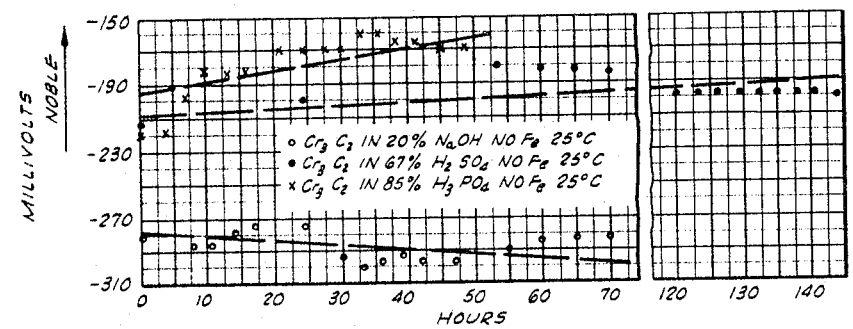

FIGURE 25 is a graph in which the potential of a chromium carbide electrode is plotted against time in order to illustrate the stability of this electrode over extended periods of usage. The plotted potential values were obtained while the chromium carbide electrode was in electrolytic contact with a sulfuric acid electrolyte, a phosphoric acid electrolyte and a sodium hydroxide electrolyte.

Figure 26:
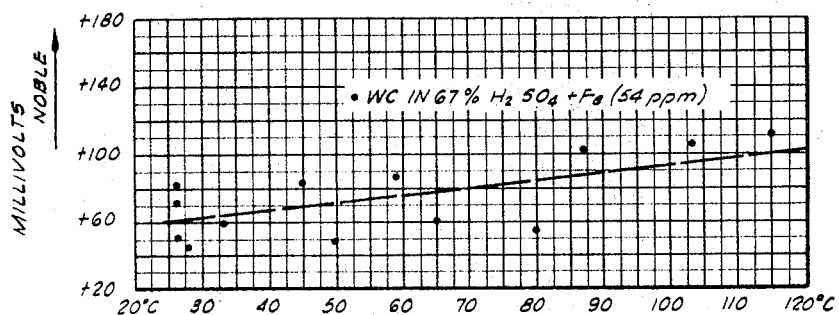

FIGURE 26 is a graph in which potential is plotted against temperature for a tungsten carbide electrode in contact with sulfuric acid.

Figure 27:
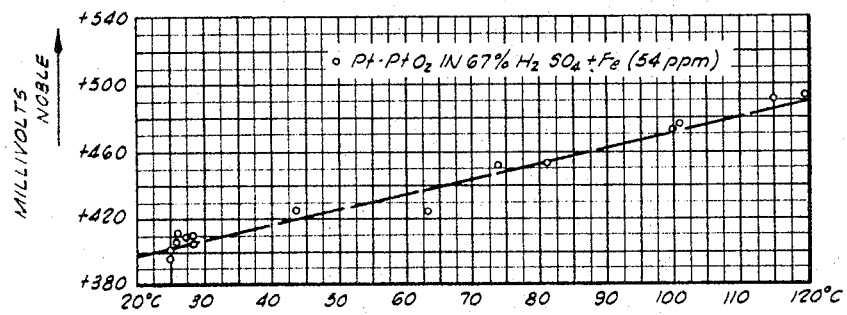

FIGURE 27 is a graph in which potential is plotted against temperature for a platinum-platinum oxide electrode in contact with concentrated sulfuric acid.

Figure 28:
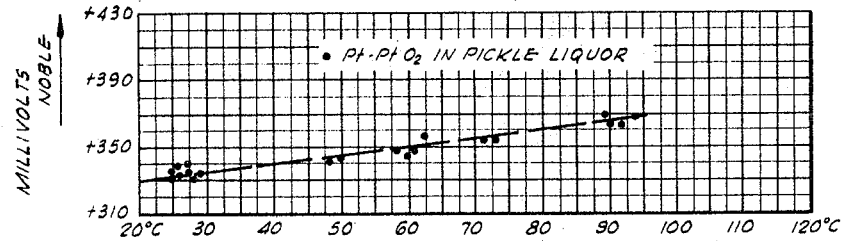

FIGURE 28 is a graph in which potential is plotted against temperature for a platinum-platinum oxide electrode in direct contact with pickle liquor electrolyte.

Figure 29:
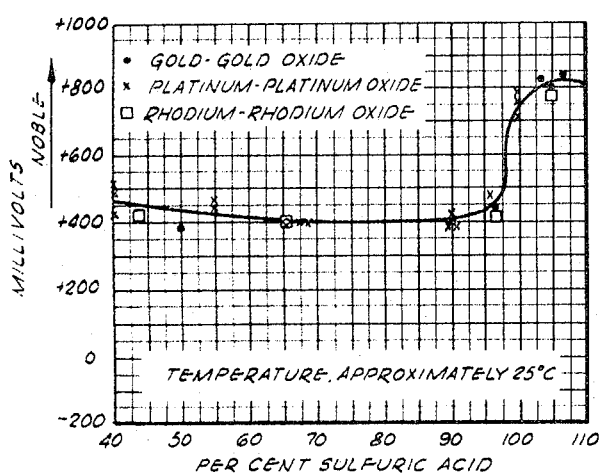

FIGURE 29 is a graph in which potential is plotted against acid concentration for certain noble metal oxide electrodes when in contact with a sulfuric acid electrolyte maintained at 25° C.

Figure 30:
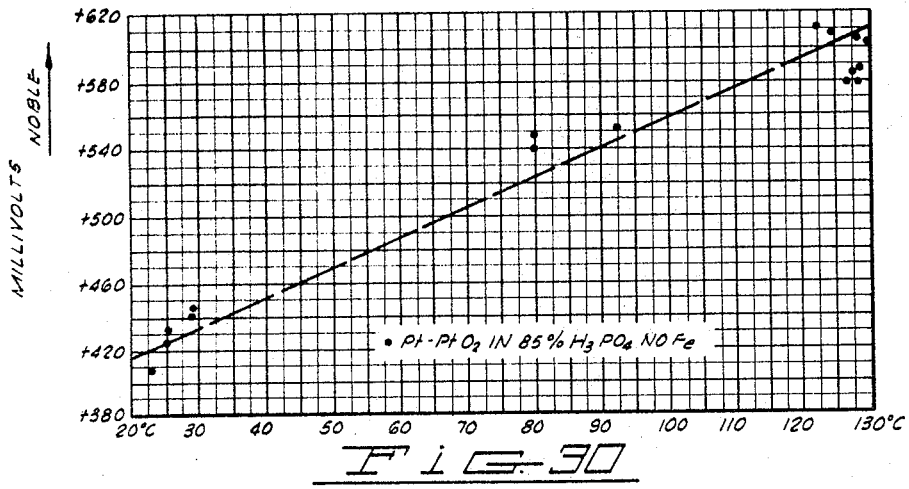

FIGURE 30 is a graph in which potential is plotted against temperature for a platinum-platinum oxide electrode in direct contact with 85% phosphoric acid.

Figure 31:
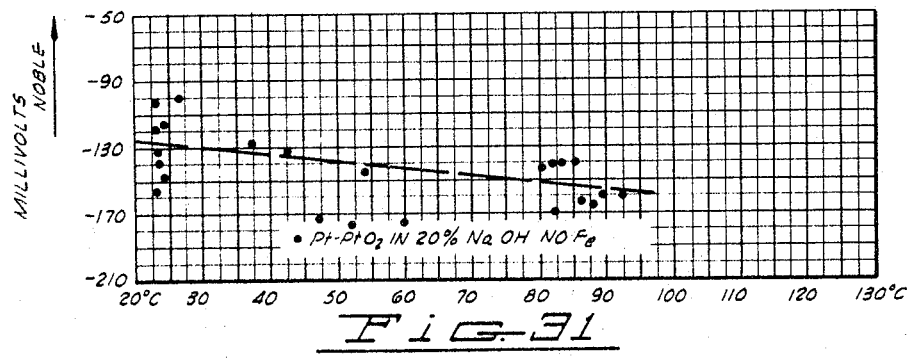

FIGURE 31 is a graph in which potential is plotted against temperature for a platinum-platinum oxide electrode in contact wtih 20% sodium hydroxide.

Figure 32:
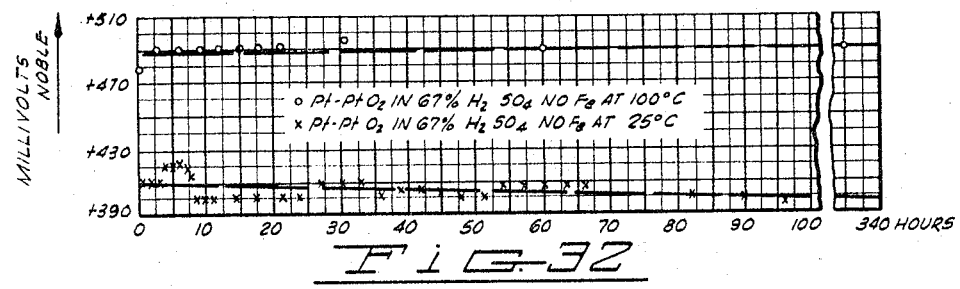

FIGURE 32 is a graph in which potential is plotted against time for platinum-platinum oxide electrodes immersed in sulfuric acid solutions maintained at different temperatures.

Figure 33:
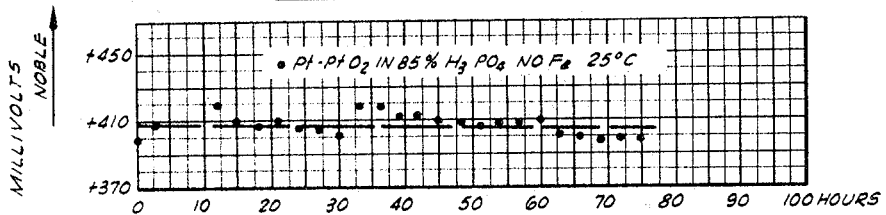

FIGURE 33 is a graph in which potential is plotted against time in order to illustrate the stability of a platinum-platinum oxide electrode in 85% phosphoric acid over extended periods of time.

Figure 34:
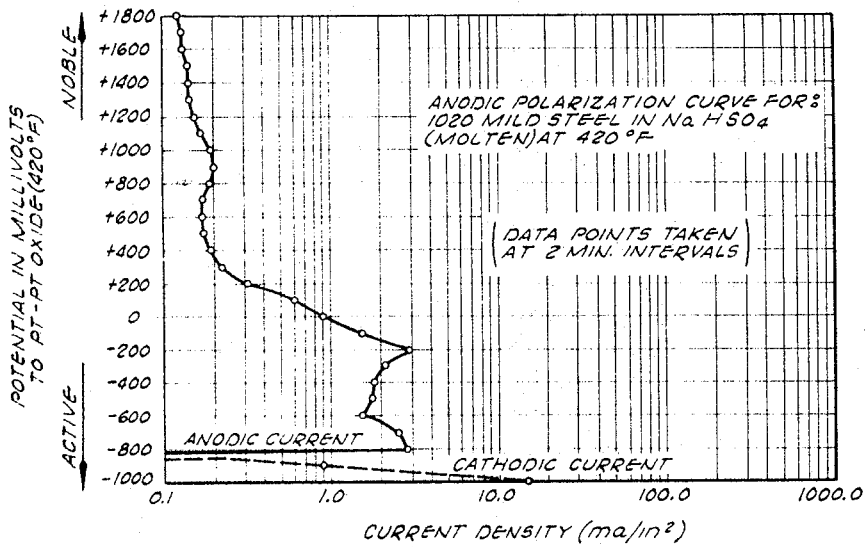

FIGURE 34 is a graph showing the anodic polarization curve for 1020 mild steel in molten sodium hydrogen sulfate.

Figure 35:
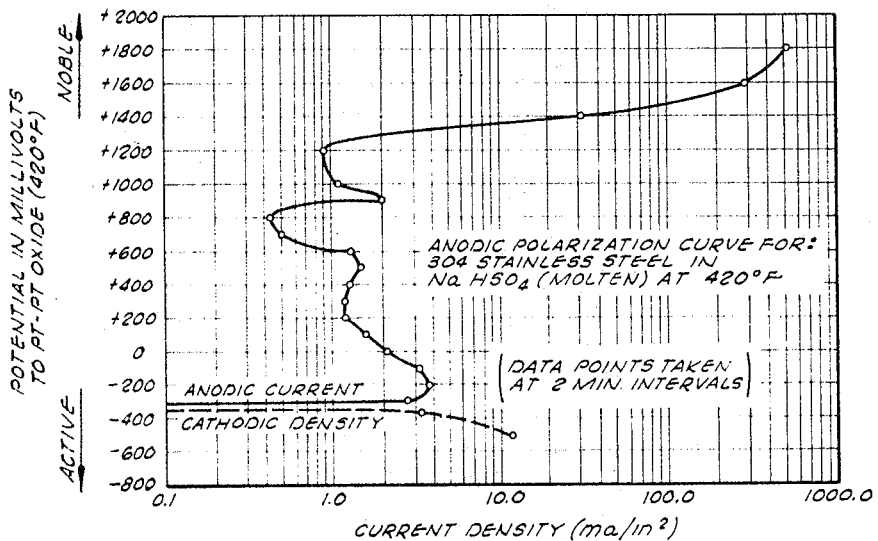

FIGURE 35 is a graph showing the anodic polarization curve for 304 stainless steel in molten sodium hydrogen sulfate.

Figure 1:
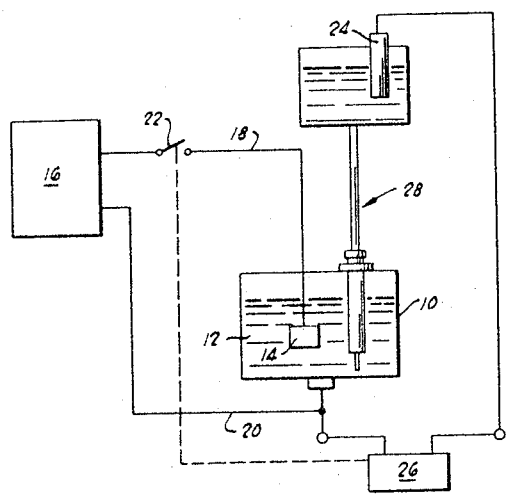
FIGURE 1 is a schematic illustration of a typical anodic polarization corrosion control system.

Referring now to the drawings in detail, and particularly, to FIGURE 1, a typical anodic polarization corrosion control system generally comprises a metallic vessel 10 or other metallic member which it is desired to protect from the corrosive influence of a corrosive electrolyte 12 which is in contact therewith. The anodic polarization system per se comprises an inert electrode 14 which is suspended in the corrosive electrolyte 12 and which is made a cathode with respect to the metallic vessel 10 which is connected as the anode in a suitable electrical circuit. The electrical circuit which includes the cathode 14 and the vessel 10 comprises a suitable source of direct current 16, electrical leads 18 and 20 connected to the cathode 14 and the vessel 10, respectively, and a suitable switch 22 for opening and closing the electrical circuit.

As has previously been explained, the control of the closure of switch 22, and consequently, the passage of current between the vessel 10 and the inert cathode 14 is effected by means of a reference electrode 24 and suitable control circuitry 26. The reference electrodes which have previously been used have generally required the use of a suitable electrolytic salt bridge which is designated in FIGURE 1 by reference character 28 in order to place the reference electrode in electrochemical communication with the corrosive electrolyte in the vessel 10.

As the potential of the metallic vessel 10 is varied with respect to the reference electrode 24, the susceptibility of the vessel to corrosive attack by the corrosive electrolyte 12 is also varied. An indication of the passivity of the vessel or its immunity to corrosive attack can therefore be determined by observing the variation in the potential difference between the reference electrode 24 and the metallic vessel 10. Since the potential of a properly functioning reference electrode remains essentially constant, variations in the potential difference between this electrode and the vessel 10 will be indicative of a change in the potential of the vessel 10 and hence a change in its susceptibility to corrosive attack. The controller 26 converts the variation in this potential difference to control signals which operate the switch 22 so that current is passed through the electrolyte between the vessel 10 and the inert cathode 14 at such times as may be required to maintain or restore the metal of the vessel 10 to a passive state.

Figure 2:
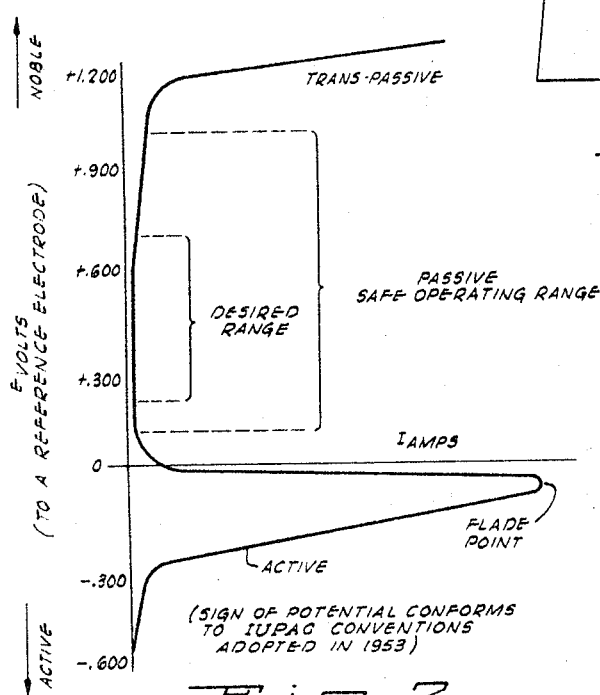
FIGURE 2 is a graph illustrating a typical polarization curve for a metallic vessel to be protected from corrosion by contact with a corrosive electrolyte contained therein.

In FIGURE 2 of the drawings, a typical anodic polarization curve is illustrated. This curve will be characteristic of each particular vessel and electrolyte system which is under the protection of the system. It will be noted that over the range of potentials at which the vessel is passive, very little current is required to be passed between the vessel and the inert cathode in order to maintain the vessel at these passive potentials. On the other hand, to pass from an active potential to the range of passivity, a large amount of current must be applied to cause the potential to change through the flade point. It should also be noted that most electrolytic systems requiring protection will, as shown in FIGURE 2, have a relatively large range of potential over which the vessel will be passive or relatively inert (noble) with respect to the electrolyte. For this reason, an isothermal potential deviation of ±50 millivolts or more can frequently be tolerated in the reference electrode without the occurrence of detrimental errors in the determination of the time and quantity of current which should be passed.

As previously indicated, it is one of the major objects of the present invention to effect improvement in anodic polarization corrosion control systems of the type illustrated in FIGURE 1 by providing reference electrodes which function in a manner superior to the calomel and silver-silver chloride electrodes which have previously been utilized for this purpose. In order to evaluate the extent to which a number of materials might approach ideality, or at least suitability, in their ability to function as reference electrodes, a great many materials have been tested by us in a variety of corrosive electrolytes which generally include those most frequently encountered in chemical storage systems of the type where corrosion protection is most essential. The electrolytes which were employed in evaluating possible reference electrode materials were sulfuric acid, oleum, phosphoric acid, polyphosphoric acid, pickle liquor, sodium hydroxide, and chromic acid. Varying concentrations and temperatures of each of these electrolytes were utilized and in the case of most of the electrode materials tested, quantities of iron were dissolved in the electrolytes to determine the effect, if any, this material might have upon the constancy of the potential of the materials tested as electrodes. The provision of substantial quantities of iron in solution in the electrolytes in many instances was effected for the purpose of simulating more closely the conditions actually obtaining in situations were anodic polarization systems are utilized to prevent the corrosion of vessels constructed of ferrous metals.

Figure 3:
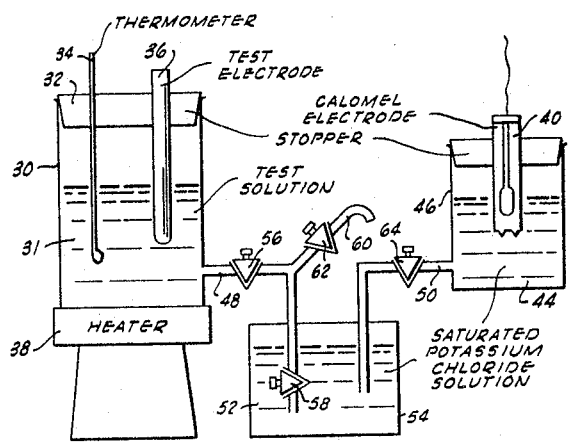
FIGURE 3 is a schematic diagram illustrating the apparatus which we have utilized in observing the stability of the potential of the reference electrodes of the present invention by measuring the potential difference between the electrode under test and a calomel reference half-cell maintained at approximately 25° C.

In order to accurately evaluate the variations in potential of the materials which were tested for suitability as reference electrodes, the testing apparatus illustrated schematically in FIGURE 3 was devised. Our previous work prior to design of the apparatus illustrated in FIGURE 3 had shown that the deterioration of agar salt bridges interposed between a corrosive electrolyte and a reference calomel electrode for the protection of the calomel electrode had caused the E.M.F. measured between the material under test and the calomel electrode to drift. The apparatus illustrated in FIGURE 3 virtually eliminates mixing of the salt bridge solution and the corrosive electrolyte being used in the test of the electrode material.

Referring to FIGURE 3, a vessel 30 constructed of glass or other suitably inert material is used to contain the corrosive electrolyte 31 utilized in the test. This vessel is provided with a stopper 32 which carries a thermometer 34 and the test electrode material 36, both of which extend into contact with the corrosive electrolyte solution 31 in the vessel 30. The vessel 30 is placed on a thermostatically controlled heater 38 which facilitates the controlled variation of the temperature of the corrosive electrolyte. A calomel electrode 40 is placed in communication with a saturated potassium chloride solution 44 contained in a suitable vessel 46. Electrically conductive communication is established between the corrosive electrolyte 31 and the saturated potassium chloride solution 44 in the vessel 46 by means of the side arms 48 and 50 extending from the vessels 30 and 46, respectively, and communicating with additional saturated potassium chloride solution 52 contained within a third vessel 54. Control of the flow of the corrosive electrolyte in the side arm 48 is achieved by means of the stopcocks 56 and 58, and by a vent arm 60 communicating with the side arm 48 and containing a stopcock 62. A stopcock 64 is interposed in the side arm 50 to control the flow of saturated potassium chloride solution between the vessel 46 and the vessel 54. All of the stopcocks are maintained in a grease-free condition. The calomel reference half-cell 40 is maintained at a temperature of approximately 25° C., and the potential difference between the test electrode and the calomel reference half-cell may be measured with a DC voltmeter, a Keithley Electrometer or other suitable measuring device.

As has been previously indicated, several of the electrodes which we have established as highly satisfactory for utilization as reference electrodes in anodic polarization corrosion control systems are liquid electrodes in which metallic mercury is maintained in equilibrium with a mercury salt having an anion in common with the electrolyte which is to be placed in contact with the electrode. In order to better facilitate the mounting of liquid electrodes of this type in the electrolyte, the electrode housing illustrated in FIGURE 4 of the drawings was devised. The electrode housing comprises a tubular member 70 which is preferably constructed of a polyhalohydrocarbon plastic, such as Teflon, or other plastic material which is not subject to attack by the corrosive electrolyte. An enlarged counterbore 72 is formed at one end of the plastic tubular member and serves as a reservoir for the liquid mercury and the mercury salt. The liquid mercury is designated by reference character 74, and the salt, which is at the bottom of the reservoir, is designated by reference character 76. A porous plate, which may suitably be constructed of fritted glass, porous alundum or the like, is designated by reference character 80 and is positioned at the bottom of the plastic tubular member 70 by means of a plastic nut 82 which threadedly engages the bottom of the plastic tubular member 70. Gas vents 84 prevent gas bubbles from collecting in the porous frit and assure intimate contact between the corrosive electrolyte and the mercury salt.

A metal contact rod 86, which is preferably constructed of an alloy, such as 303 stainless steel, extends through the plastic tubular member 70 and terminates with its lower end in contact with the metallic mercury 74. The contact rod 86 extends through a plastic sealing member 88 of double wedge-shaped cross-section which closes the upper end of the plastic tubular member 70, and through a suitable sleeve of insulating material 90 which is positioned above the sealing member 88 inside the bore of a metallic head member 92. The metallic head member 92 is recessed at its lower end and is provided with internal threads 96 so that it may be connected to the externally threaded top of the plastic tubular member 70. It will be perceived by reference to FIGURE 4 that when the metallic head member 92 is tightened downwardly upon the plastic tubular member 70, the sealing member 88 (preferably made of a plastic, such as polytetrafluoroethylene) will be compressed so as to tightly grip the metallic contact rod 86. The flat areas 99 on the exterior of tubular member 70 may be gripped with a wrench during the tightening of the head member 92. In order to facilitate the engagement of the head member 92 with a threaded aperture in the tank or vessel which is to be protected, an externally threaded portion 98 is provided on the head member.

The types of liquid electrodes which have been found suitable for use as reference electrodes in anodic polarization corrosion control systems include a mercury-mercurous sulfate electrode for use in oleum and sulfuric acid, a mercury-mercurio phosphate electrode for use in phosphoric and polyphosphoric acid electrolytes, a mercury-mercuric oxide electrode for use in strongly basic electrolytes, and more particularly, but without being limited thereto, in the alkali metal hydroxides, and a pure metallic mercury electrode for use in strong acid and base electrolytes, perferably when these electrolytes are maintained at relatively high temperatures.

Mercury-mercury salt electrodes

Figure 5:
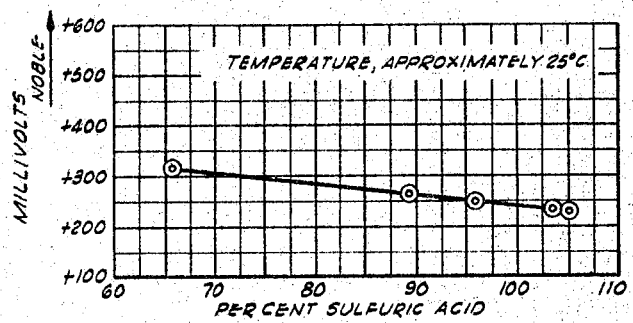
FIGURE 5 is a graph showing the effect of variations in the concentration of a sulfuric acid electrolyte upon the potential of a mercury-mercurous sulfate electrode as indicated in terms of the E.M.F. between such electrode and a saturated calomel half-cell maintained at a temperature of approximately 25° C. The temperature of the sulfuric acid electrolyte is approximately 25° C.

Considering first the characteristics of the mercury-mercurous sulfate electrode, reference is made to FIGURE 5 of the drawings in which a graph is illustrated which depicts the effects of variations in the concentration of a sulfuric acid electrolyte upon the potential of the mercury-mercurous sulfate electrode. The potential of the mercury-mercurous sulfate electrode is indicated in terms of the E.M.F. between such electrode and a saturated calomel half-cell maintained at a temperature of approximately 25° C. The temperature of the sulfuric acid electrolyte was also approximately 25° C. The testing apparatus illustrated in FIGURE 3 was utilized in obtaining the E.M.F. values. It will be perceived in referring to FIGURE 5 that a total potential variation of considerably less than 100 millivolts was displayed by the mercury-mercurous sulfate electrode as the concentration of the sulfuric acid was varied from 65% to 105%. No solubility of the electrode in the acid at any of the concentrations was noted. The constancy of the mercury-mercurous sulfate electrode potential thus compares well with the potential stability of calomel electrodes over the same range of acid concentrations.

Figure 6:
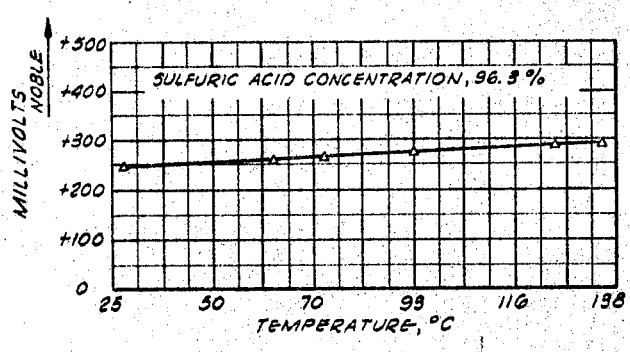
FIGURE 6 is a graph illustrating the effect of variations of electrolyte temperature upon the potential of a mercury-mercurous sulfate reference electrode in direct contact with a sulfuric acid electrolyte. The concentration of the sulfuric acid electrolyte is 96.3%.

In order to evaluate the temperature stability of the mercury-mercurous sulfate electrode, the electrode was placed in contact with sulfuric acid of 96.3% concentration and its potential measured with reference to a saturated calomel electrode maintained at 25° C. as the temperature of the sulfuric acid solution was varied from 25° C. through 125° C. (80° F.–280° F.). A plot of the E.M.F. variation against temperature variation is illustrated in FIGURE 6 of the accompanying drawings. The constancy of the E.M.F. of this electrode with respect to calomel may also be perceived in referring to Table I below which tabulates the E.M.F. measured for each of several temperatures throughout the range of temperatures utilized.

TABLE I

| Solution temperature, ° C.: | E.M.F. to calomel @ 25° C., in millivolts |
|---|---|
| 29 | 255 |
| 63 | 260 |
| 93 | 270 |
| 121 | 290 |

That the temperature stability of the mercury-mercurous sulfate electrode is considerably better than that of the saturated calomel electrode will be obvious by comparison of FIGURES 6 and 7. In FIGURE 7, the E.M.F. developed between a calomel electrode placed in contact with 67% concentrated sulfuric acid and a reference calomel electrode maintained at 25° C. is plotted against temperature. Two tests were conducted. In one of the tests, 55 parts per million of iron were dissolved in the sulfuric acid, while in the other test the acid contained no iron. The graph of FIGURE 7 clearly indicates that the potential of a saturated calomel electrode placed in contact with concentrated sulfuric acid through an electrolytic salt bridge varies over a range of about 140 millivolts as the temperature of the sulfuric acid electrolyte is varied between 20° C. and 100° C. (68° F. and 212° F.). The mercury-mercurous sulfate electrode is thus clearly superior to the calomel electrode with respect to the property of temperature stability. Therefore, although in some instances it may be necessary to compensate for variations in the potential of a calomel reference electrode as a result of variations in the temperature of the electrolyte in which it is used, this will seldom be necessary with the mercury-mercurous sulfate electrode as a result of its excellent temperature stability.

The mercury-mercurous sulfate electrode also exhibits its superior temperature stability in the presence of sulfonic acids and alkylsulfuric acids, and even maintains its stability during the sharp pH change which occurs during neutralization of one of these acids with strong alkali. Below are typical data obtained during neutralization of an alkylarylsulfonic acid with sodium hydroxide in a neutralization vessel equipped with a suitable mixing apparatus:

TABLE Ia

| E.M.F. millivolts | Temperature, ° C. | Solution pH |
|---|---|---|
| 20% NaOH solution −250 (Noble to saturated calomel) | 33 | 11 |
| During first sulfonic acid addition: | | |
| −260 | 64 | 10 |
| −270 | 73 | 10 |
| −270 | 68 | 2 |
| −270 | 65 | 1 |
| During first sodium hydroxide addition: | | |
| −270 | 70 | 10 |
| −270 | 66 | 11 |
| During second sulfonic acid addition: | | |
| −270 | 63 | 10 |
| −270 | 58 | 2 |
| −270 | 46 | 3 |
| −270 | 25 | 3 |
| During second sodium hydroxide addition: | | |
| −270 | 30 | 10 |
| −260 | 25 | 10 |
| During third sulfonic acid addition: | | |
| −270 | 34 | 2 |
| −270 | 32 | 2 |

The virtual independence of the E.M.F. of this electrode to both temperature and pH fluctuation in this environment makes this electrode particularly useful in the anodic protection of neutralizer vessels, thereby increasing the life of the vessels and decreasing the iron content of the neutralized product.

In summary, then, it may be stated that the mercury-mercurous sulfate electrode displays a potential which is nearly independent of electrolyte concentration, pH and temperature. Moreover, the electrode is durable, since it is inert or insoluble in the electrolyte over a wide range of acid concentration and temperature. Lastly, the electrode requires no cumbersome salt bridge or other conducting solutions, but instead, may be placed in direct contact with the corrosive electrolyte and is therefore easier to install and to maintain. The mercury-mercurous sulfate electrode may also be used in other electrolytes in addition to the sulfuric acid, sulfonic acid and oleum solutions in which the potential tests were conducted.

Potential tests were also conducted on a mercury-mercuric phosphate electrode. The electrolytes employed were phosphoric and polyphosphoric acid solutions of different concentrations and temperatures. In Table II below, the variation of the mercury-mercuric phosphate electrode potential with variations in the concentration of the phosphoric acid electrolyte are tabulated.

TABLE II

| Acid concentration: | E.M.F. referenced to saturated calomel, in millivolts |
|---|---|
| 85.9 | 380 |
| 96.3 | 380 |
| 115.0 | 340 |

From the tabulated values, it will be apparent that the E.M.F. of the mercury-mercuric phosphate electrode with respect to the saturated calomel electrode maintained at approximately 25° C. remains substantially constant as the concentration of the acid is varied between 85% and 115%. (By 115% phosphoric acid is meant phosphoric acid containing free $P_2O_5$.).

In Table III, the values of the potential of the mercury-mercuric phosphate electrode over a wide range of varying temperatures are tabulated. The concentration of the phosphoric acid electrolyte employed was 115%. As the table clearly illustrates, the potential of the electrode remains nearly constant over a range of solution temperatures extending from 25° C. to 150° C.

TABLE III

| Solution temperature, ° C.: | E.M.F. to saturated calomel, in millivolts |
|---|---|
| 25 | 340 |
| 29 | 330 |
| 45 | 350 |
| 70 | 350 |
| 75 | 330 |
| 89 | 325 |
| 100 | 320 |
| 125 | 325 |
| 150 | 320 |

In addition to the excellent temperature and concentration stability of the mercury-mercuric phosphate electrode the electrode is substantially insoluble in the electrolyte and does not require the utilization of any type of salt bridge or other interconnecting conducting solution.

The suitability of a mercury-mercuric oxide electrode for use as a reference electrode in a sodium hydroxide electrolyte was evaluated. This electrode demonstrated complete inertness to attack by the caustic electrolyte and also displayed excellent concentration and temperature stability as indicated by the results tabulated in Tables IV and V below. Moreover, the electrode does not require the employment of any salt bridge and may be placed in direct contact with the electrolyte.

TABLE IV

| Sodium hydroxide concentration, percent NaOH: | E.M.F. to saturated calomel, in millivolts |
|---|---|
| 5 | −106 |
| 10 | −112 |
| 20 | −126 |
| 40 | −154 |

TABLE V

| Temperature, °C. using 20 percent NaOH: | E.M.F. to saturated calomel, in millivolts |
|---|---|
| 25 | −130 |
| 30 | −126 |
| 40 | −124 |
| 50 | −122 |
| 60 | −120 |
| 70 | −120 |
| 80 | −120 |
| 90 | −120 |
| 100 | −120 |

In addition to tests of the stability of the electrode potential in sodium hydroxide of varying concentrations and temperatures, the E.M.F. of the electrode with respect to a calomel half-cell maintained at approximately 25° C. was also measured when 1% sodium carbonate was added to each of the 10% and 20% sodium hydroxide solutions. The addition of the sodium salt to the electrolyte did not change the E.M.F. values recorded for the electrode when in contact with these two electrolyte solutions.

The mercury-mercuric oxide electrode utilized in the test was prepared by adding metallic mercury to red mercuric oxide and mixing in a Waring blender to yield a thick paste. This paste was then put into an alundum thimble and a platinum lead-in wire was inserted through a stopper placed in the top of the thimble. The mercury-mercuric oxide electrode so constructed was then immersed directly in the sodium hydroxide test solution for E.M.F. measurements. The apparatus illustrated in FIGURE 4 of the accompanying drawings may also be utilized for the construction of the mercury-mercuric oxide electrode.

In view of the stability of the potential of mercury-mercury salt electrodes utilized in contact with electrolytes having an anion in common with the mercury salt of the electrode, it is deemed a logical and justified extension of the results obtained from the tests of such electrodes to conclude that for a given electrolyte, a highly suitable reference electrode can be formed from metallic mercury in equilibrium with a mercury salt having an anion in common with the electrolyte in which the electrode is to be utilized. For example, it is to be expected that the potential of a mercury-mercurous acetate electrode would be essentially independent of the concentration and temperature of an acetic acid or acetic anhydride electrolyte.

The simple metallic mercury electrode was also found to possess, in excellent degree, many of the attributes of an ideal reference electrode for use in anodic polarization corrosion control systems. In the frame of reference of the electrode classifications which we have described above, this material is somewhat of an anomaly, since, of course, it is liquid at room temperatures rather than a solid. However, the mercury electrode may best be described as a simplified mercury-mercury salt electrode, since we have found that the latter type of electrode is actually formed after the mercury metal electrode has been placed in contact with a hot, oxidizing electrolyte.

Figure 4:
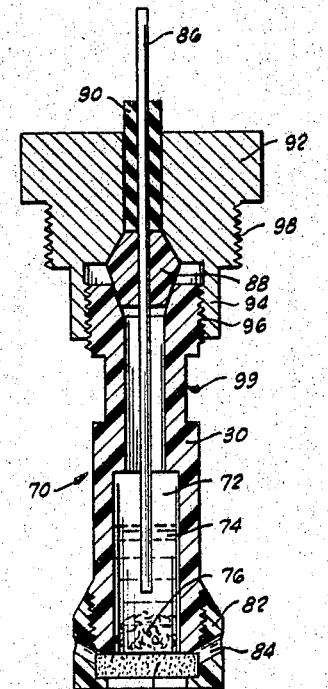
FIGURE 4 illustrates one embodiment of the novel mercury-insoluble mercury salt electrodes of the present invention. The same general construction may also be employed for the mercury electrode of the invention.

In the construction of the mercury electrode, the mercury metal is simply placed in a porous container, such as the type shown in FIGURE 4, or in an alundum thimble. The mercury-containing porous container is then immersed in, say, a sulfuric acid electrolyte, and mercurous sulfate paste is formed spontaneously. The simplified electrode then performs in the same way as a mercury-mercury sulfate electrode.

Table VI below illustrates the rate of equilibration and extended period stability of a metallic mercury electrode used in a sulfuric acid electrolyte.

TABLE VI

| E.M.F. in millivolts: | Time, hours |
|---|---|
| 295 | 0 |
| 270 | 0.17 |
| 240 | 3 |
| 240 | 15 |

In FIGURE 8 of the drawings, the potential of a saturated calomel reference electrode in 67% sulfuric acid at various temperatures is plotted against time. The purpose of this graph is to portray for purposes of comparison, the stability of the calomel electrode potential over extended periods of time. It will be noted that in the case of the calomel electrodes used in the electrolyte when the latter is maintained at higher temperatures, some fluctuation in potential occurs over extended periods of usage. Nevertheless, this fluctuation is relatively small and generally does not constitute a problem with the calomel electrode.

Solid elemental electrodes

In FIGURE 9 of the drawings the potential of a carbon electrode is plotted against temperature when the carbon electrode is immersed in 67% sulfuric acid. Two sets of data are plotted upon the graph of FIGURE 9. One of these represents the potential of the carbon electrode when 54 parts per million of iron are included in the electrolyte and the other represents the potential of the carbon electrode when no iron is included in the electrolyte. It will be observed that the total variation of the mean potential of the carbon electrode in both instances amounts to no more than 80 millivolts. This compares favorably with the fluctuation of the calomel electrode as illustrated in FIGURE 7 and is entirely suitable for systems yielding a polarization curve such as that illustrated in FIGURE 2 of the drawings.

One of the electrode materials tested for potential stability under varying temperature conditions was a zirconium-tungsten alloy sold under the trade name Zirtung by the Sylvania Electric Company. Alloys of this type generally comprise less than 5% by weight zirconium and the balance tungsten. In FIGURE 10 of the drawings, the potential of a Zirtung (approximately 0.1% zirconium) electrode is plotted against temperature for a test in which the electrode was immersed in a 67% sulfuric acid electrolyte containing 54 parts per million of iron and also the same electrolyte containing no iron. It will be observed that the potential varies over a maximum range of 110 millivolts over the temperature range of 20° C. to 95° C. for the electrolyte. As will become apparent as the discussion of the present invention proceeds, each of the electrode materials tested displayed some isothermal instability of potential at the low temperatures initially utilized in the test. However, this is not considered to be necessarily indicative that such isothermal instability would exist in all situations of actual use in a corrosion protection system, since once the electrode has had time to stabilize, it is believed that substantially less isothermal instability will occur. In any event, even isothermal instability of the type shown at 25° C. by the Zirtung electrode as illustrated in FIGURE 10 is not considered a serious disadvantage, since in practically every instance the passive range of potential which is characteristic of a metallic vessel to be protected will be sufficiently broad that isothermal potential deviations of the scope characterizing the Zirtung electrode will be entirely tolerable. Moreover, it will be noted that the mean electrode potential for the Zirtung electrode actually covers only the range between 160 and 240 millivolts over the temperature range at which the test was conducted. This is considerably better than the 140 millivolt range observed for the calomel electrodes over a corresponding temperature range as shown in FIGURE 7.

In FIGURE 11 of the drawings, the potential of the Zirtung electrode in 85% phosphoric acid containing no of only 30 millivolts was observed. In FIGURE 21, the performance of the niobium electrode in a pickle liquor electrolyte is represented. Again, the niobium electrode appears to have excellent isothermal stability, as well as excellent mean potential stability over the range of temperatures at which the potential measurements were made.

The elemental carbon electrode was also tested in a pickle liquor electrolyte and its potential stability is represented by a second curve shown on the graph in FIGURE 21. The carbon electrode appears to possess properties very similar to the niobium electrode in this electrolyte. It is thus apparent that either of these electrodes will function quite well in a corrosive pickle liquor electrolyte which is subject to wide variations of temperature.

To summarize the results of the tests conducted upon various solid, elemental metallic electrodes as represented by FIGURES 9 through 21, it appears that the materials which yield the results illustrated in each of these graphs is capable of functioning quite well in the corrosive electrolyte materials in which the tests were made. In practically every instance, the electrodes demonstrated better mean potential stability than that which is attributable to the calomel electrode. In addition to the tests described above, the gold, carbon and tungsten electrodes were examined in 67% sulfuric acid maintained at constant temperature (in excess of 50° C.) for a long period of time. These electrodes attained equilibrium and became stable several hours faster than calomel. Although a number of other solid, elemental metallic materials were tested as electrodes, they were either found to be at least partially soluble in the electrolytes utilized, or to lack sufficient temperature stability to function efficiently in anodic polarization corrosion control systems except in relatively limited circumstances of variation in electrolyte potential and temperature.

One of the most versatile of the electrode materials tested appears to be tungsten, which performs very well in sulfuric acid solutions, both with and without dissolved iron, fairly well in concentrated phosphoric acid, excellently in pickle liquor, and only slightly less effectively in 20% sodium hydroxide solution. The niobium electrode appears to function well in both sulfuric acid and pickle liquor electrolytes. Carbon is a suitable electrode material for use in sulfuric acid both containing iron and not containing iron, and also in pickle liquor and in phosphoric acid. One of the best performing materials tested in terms of over-all performance in electrolytes was the gold electrode. Thus, this electrode demonstrated very good isothermal stability as well as mean potential stability in the sulfuric acid electrolyte, in phosphoric acid, and in sodium hydroxide. In the latter material, the gold appears to have the best mean potential stability of any of the materials tested in this strong base electrolyte.

Chromium carbide and tungsten carbide electrodes

Among the other electrode materials which were studied in order to evaluate their suitablity as reference electrodes, a chromium carbide rod was found to possess good thermal stability in the electrolytes in which it was tested, and to also possess good potential stability upon variation of electrolyte concentration. In FIGURE 22, the potential of the chromium carbide electrode is plotted against temperature when the electrode is placed in direct contact with a 67% sulfuric acid electrolyte. In the plot at the bottom of the graph, the electrolyte contains 54 parts per million of iron, while in the plot at the top of the graph no iron was placed in the electrolyte. In both instances, both the isothermal stability and the mean potential stability of the electrode in this electrolyte were excellent.

In FIGURE 23, the thermal stability of the chromium carbide electrode in 85% phosphoric acid containing no iron is indicated. The stability of the mean potential of the electrode upon variation of the temperature was considered to be excellent, and the isothermal stability of the electrode considered fair.

Tests of the stability of the chromium carbide electrode with variations in acidic electrolyte concentration indicated that at concentrations of sulfuric acid above 65%, the potential of this electrode varies substantially. This variation is reflected in the results plotted on the graph of FIGURE 24. The fluctuation which occurs in sulfuric acid solutions of greater concentration than 65% will, however, be perceived to consist of a fairly regular and predictable range of potential. The chromium carbide electrode may therefore be utilized in the higher concentrations of sulfuric acid if a factor to compensate for potential variations with variation in concentration is introduced into the potential difference read between the chromium carbide reference electrode and the metallic vessel or other metallic object to be protected by the anodic polarization corrosion control system. On the other hand, the stability of this electrode is quite good at acid concentrations of less than 65% and over the usual operating ranges of electrolyte temperature.

In order to determine the stability of the reference potential indicated by the chromium carbide in various electrolytes over extended periods of usage, the potential difference of this electrode with respect to a calomel electrode maintained at 25° C. was measured, using a recording potentiometer. The results of these long term electrode stability tests are indicated by the graph portrayed in FIGURE 25. Long term potential stability measurements were made for the chromium carbide electrode in 20% sodium hydroxide electrolyte maintained at 25° C., in 67% sulfuric acid electrolyte maintained at 25° C., and in 85% phosphoric acid electrolyte maintained at 25° C. None of these electrolytes contained dissolved iron. The long term potential stability of the electrode in the sodium hydroxide and sulfuric acid electrolytes was considered to be excellent. The potential of the electrode in the phosphoric acid over a 50-hour period was, however, more erratic than desirable. However, most of the instability observed in the electrode potential occurred during the initial hours of usage and it is believed that satisfactory stability can be obtained by preconditioning the electrode in the phosphoric acid electrolyte prior to commencing actual corrosion control using the chromium carbide electrode as the reference electrode in direct contact with this electrolyte.

Tests of the chromium carbide electrode in sodium hydroxide electrolytic solutions indicate that at concentrations less than 20%, this electrode is essentially independent of variations in electrolyte concentration. This is shown by the data tabulated in Table VII.

TABLE VII

| Percent NaOH: | E.M.F. to saturated calomel, in millivolts |
|---|---|
| 5 | −172 |
| 10 | −170 |
| 20 | −230 |
| 40 | −570 |

Another metallic carbide electrode which was tested and which yields satisfactory results is the tungsten carbide electrode. A graph in which the potential of this electrode is plotted against temperature while the electrode was in direct contact with a 67% sulfuric acid solution containing 54 parts per million of iron is illustrated in FIGURE 26. The relatively small variation of 50 millivolts in the mean potential of the electrode over the temperature range of 25° C. to 115° C. was considered excellent. The isothermal stability of the electrode was also good, comprising a maximum deviation of about ±25 millivolts from the mean potential at the temperature of greatest deviation (about 85° C.).

Reversible metal-metal oxide electrodes

As previously indicated herein, a number of reversible electrodes comprising a metallic base with a metal oxide coating thereon were also tested for suitability as reference electrodes in anodic polarization corrosion control systems. The group of electrodes found to be suitable included a platinum-platinum oxide electrode, a gold-gold oxide electrode, a rhodium-rhodium oxide electrode, a molybdenum-molybdenum oxide electrode, a palladium-palladium oxide electrode, a hafnium-hafnium oxide electrode, a scandium-scandium oxide electrode, a manganese-manganese oxide electrode, a cobalt-cobalt oxide electrode, a nickel-nickel oxide electrode, a chromium-chromium oxide electrode, a tungsten-tungsten oxide electrode, a tantalum-tantalum oxide electrode, a niobium-niobium oxide electrode, and a zirconium-zirconium oxide electrode. Other metal-metal oxide reversible electrodes which were tested proved unsuitable, for use in corrosion control systems, either because of their solubility in the corrosive electrolytes utilized, or because of their lack of stability with respect to the temperature or concentration of the electrolyte.

Several platinum monoxide electrodes were prepared, tested and found to behave satisfactorily in 67% sulfuric acid, both with and without iron. However, the most satisfactory platinum-platinum oxide electrodes were prepared in a manner calculated to yield a mixture of the dioxide and the monoxide of the metal. In one of the methods of preparation, a platinum rod covered with a coating of platinum black was placed in a bath of fused potassium chlorate and connected in an electrolytic circuit which included the salt bath so as to make the platinum rod the anode in the circuit. Current was passed through the circuit to obtain a current density varying between about 2.5 and about 50 milliamperes per square inch at the platinum anode during various runs. After about 3 hours, a dark grey coating formed upon the platinum rod which, upon electron diffraction evaluation, was shown to be an amorphous layer. The identification of the gray, amorphous layer as a mixture of platinum dioxide and platinum monoxide was made spectrophotometrically.

Another method of preparing platinum-platinum oxide electrodes which was employed was that of making a platinum rod the anode in a fused potassium nitrate bath and applying a current density of about 2.5–50 milliamperes per square inch to the platinum anode in an electrolytic circuit including the platinum anode and the salt bath. In this instance, the amorphous coating which was formed upon the platinum material was light brown in color. However, spectrophotometric tests again indicated the coating to be the mixed metal oxides.

Finally, as a preferred method of preparing the platinum-platinum oxide electrode, a platinum rod was dipped in fused potassium nitrate maintained at a temperature of about 400° C. and was allowed to remain in the molten salt for a period of at least 1 hour. In the electrodes prepared by this method, the amorphous coating was lusterless and without apparent color. Again analytical evidence indicated the presence in the coating of mixed platinum oxides.

Spectrophotometric examination of the oxide films of the platinum-platinum oxide electrodes shows that the average film consists of a mixture of PtO and $PtO_2$ in the ratio range of about 3:1 to about 7:1, respectively. The film thickness has been found to vary from about 12 to 157 atomic layers, depending upon the method of fabrication, rather than upon the reaction time employed in the oxidation treatment.

All of the platinum-platinum oxide electrodes prepared by the described methods appeared to give substantially the same potential readings in the various electrolytes in which they were tested. Therefore, the platinum-platinum oxide electrode prepared by the method last described above was utilized in the majority of the tests due to the relative ease of fabrication as compared to the other platinum-platinum oxide electrodes. Within our knowledge, platinum-platinum oxide electrodes have not heretofore been fabricated by any method.

In FIGURE 27, the results of potential stability tests of a platinum-platinum oxide electrode in 67% sulfuric acid containing 54 parts per million iron have been portrayed in the form of a graph. The temperature stability of this electrode is seen to be comparable to that of the calomel electrode. The range of measured potential over a temperature range of 100° C. is from about 390 millivolts to 490 millivolts. Despite this slight temperature instability of the platinum-platinum oxide electrode in a sulfuric acid electrolyte containing iron, the many other advantageous qualities of this electrode make it one of the most suitable for use in anodic polarization corrosion control systems. Thus, it will be perceived by reference to FIGURE 28 that the platinum-platinum oxide electrode performs well in a sulfuric acid pickle liquor electrolyte. Its mean potential stability is also excellent in 20% sodium hydroxide as indicated in FIGURE 31. The temperature stability of the platinum-platinum oxide electrode in 85% phosphoric acid electrolyte in which no iron was dissolved, while satisfactory, was not as good as the stability of this electrode in the other electrolytes in which it was tested. The results of potential measurements made while the electrode was in direct contact with the phosphoric acid electrolyte are portrayed in the graph illustrated in FIGURE 30. It will be noted that the temperature range over which the test was conducted in obtaining the FIGURE 30 data was from about 22° through 130° C.

In order to evaluate the long term electrode stability of platinum-platinum oxide electrodes, tests were conducted to evaluate this parameter when the electrode was placed in direct contact with 67% sulfuric acid containing no iron and maintained at 100° C., 67% sulfuric acid containing no iron and maintained at 25° C., and 85% phosphoric acid containing no iron and maintained at 25° C. The results of these tests are plotted in the graphs shown in FIGURES 32 and 33. It will be noted that in each case, the stability of the potential of the electrode in these electrolytes over extended periods of time was excellent, being in every instance as good, or better, than the long term electrode stability of the calomel electrode.

In addition to the tests of the platinum-platinum oxide electrode which yielded the results plotted in the graphs shown in FIGURES 27, 28 and 30 through 33, this electrode was also tested to determine the stability of its potential in phosphoric acid solutions of varying concentration. The results obtained from measurements of the E.M.F. relationship between the platinum-platinum oxide electrode and the reference, saturated calomel electrode at approximately 25° C. is tabulated in Table VIII. It will be seen from the data in this table that the platinum-platinum oxide electrode is relatively insensitive to changes in phosphoric acid concentration and even maintains its potential stability in polyphosphoric acid containing free phosphorous pentoxide.

TABLE VIII

| Acid concentration, percent $H_3PO_4$: | E.M.F. referenced to calomel, in millivolts |
|---|---|
| 85.9 | 365 |
| 96.3 | 340 |
| 115 | 340 |

A test was also conducted to determine the stability of the potential of a platinum-platinum oxide electrode in a chromic acid cleaning mixture of the type commonly employed in cleaning laboratory glassware. This cleaning mixture consisted of 92 grams of sodium dichromate dihydrate, 458 grams of distilled water, and 800 ml. of concentrated sulfuric acid (96%). The time required for the electrode to become stabilized in the chromic acid cleaning mixture was evaluated, and the results of this evaluation are tabulated in Table IX below.

TABLE IX

Platinum-platinum oxide electrode in chromic acid cleaning mixture

| Time, minutes: | E.M.F. referenced to calomel, in millivolts |
|---|---|
| 0 | 1250 |
| 5 | 1300 |
| 22 | 1380 |
| 30 | 1370 |
| 42 | 1370 |
| 102 | 1370 |
| 255 | 1370 |

It will be perceived that the platinum-platinum oxide electrode came readily to a stable E.M.F. value and retained this E.M.F. over an extended period of time. This result confirms the extended time stability of the platinum-platinum oxide electrode observed in the sulfuric acid electrolyte and represented by the graph depicted in FIGURE 32.

In addition to the platinum-platinum oxide electrode, a rhodium-rhodium oxide electrode was prepared in a manner similar to the preparation of the platinum-platinum oxide electrode. A strip of rhodium metal was dipped in a bath of fused potassium nitrate maintained at a temperature of about 400° C. The rhodium strip was maintained in contact with the hot salt for a period exceeding 12 hours. The type of oxide which is formed by this procedure was determined by X-ray diffraction to be $Rh_2O_3$. It is believed that we are the first to fabricate a rhodium-rhodium oxide electrode.

Upon testing the rhodium-rhodium oxide electrode in sulfuric acid electrolytes of varying temperature and concentration, a behavior substantially identical to that exhibited by the platinum-platinum oxide electrode resulted. Temperature stability of the electrode was very good. However, in the case of both the rhodium-rhodium oxide and platinum-platinum oxide electrodes, the potential of the electrodes remained substantially constant over a range of lower concentrations of the sulfuric acid electrolyte, then changed sharply at a concentration of approximately 96% of the acid and then once again assumed stability at concentrations of from approximately 100% to 115% sulfuric acid. These tests of electrode potential stability against sulfuric acid concentration indicate that the rhodium-rhodium oxide and platinum-platinum oxide electrodes can be used to excellent advantage in a corrosive sulfuric acid electrolyte of less than 96% acid concentration, or of greater than 100% acid concentration (oleum). Between these two ranges of acid concentrations, however, a factor must be introduced to compensate for the change in electrode potential with changes in acid concentration. A preferred use of these two noble metal-noble metal oxide electrodes would therefore appear to be in oleum service and in sulfuric acid service where the concentration of the sulfuric acid is less than 96%.

In addition to the electrodes made from the noble metals rhodium and platinum, a gold-gold oxide electrode was also fabricated and appeared to possess electrode characteristics quite similar to that of the rhodium-rhodium oxide and platinum-platinum oxide electrodes. Thus, in FIGURE 29, it may be observed that the potential of the gold-gold oxide electrode also is quite stable for sulfuric acid or oleum concentrations of less than 96% and greater than 100%, respectively. The stability of the gold-gold oxide in oleum is evidenced by the data tabulated in Table X.

TABLE X

| Oleum concentration | | E.M.F. referenced to calomel, in millivolts |
|---|---|---|
| Percent $H_2SO_4$ | Percent free $SO_3$ | |
| 103.4–104.1 | 15.0–18.0 | 820 |
| 104.5–105.2 | 20.0–23.0 | 800 |
| 106.8–107.4 | 30.0–33.0 | 840 |

It is apparent that the electrode maintains a substantially constant potential as the percentage of free sulfur trioxide in the oleum electrolyte is varied between 15% and 33%. This stability of the noble metal-noble metal oxide electrode in oleum solutions is especially desirable in view of the wirespread use of this electrolyte in various chemical manufacturing and processing industries.

One of the most desirable characteristics of the gold-gold oxide electrode is its ability to become rapidly stabilized in most of the electrolytes in which it was tested. In this respect, the gold-gold oxide electrode was superior to either the platinum-platinum oxide electrode, or the rhodium-rhodium oxide electrode. Typical data showing the effect of aging on the potential of the gold-gold oxide electrode are tabulated in Table XI which shows the effect of maintaining the electrode in contact with an oleum electrolyte containing from 30% to 33% free sulfur trioxide over a period of 24 hours.

TABLE XI

| Time, hours: | E.M.F. referenced to calomel, in millivolts |
|---|---|
| 0.25 | 830 |
| 4.75 | 830 |
| 8.25 | 850 |
| 24.0 | 840 |

The data tabulated in Table XI indicate that, within 15 minutes of its being placed in contact with the oleum electrolyte, the gold-gold oxide electrode has attained the potential which it will then maintain for the next 24 hours. The excellent stabilization rate of this electrode is believed to be superior to the rate of stabilization of any of the other materials tested and found to be suitable for use as reference electrodes.

In tests of the gold-gold oxide electrode in a phosphoric acid electrolyte, the electrode demonstrated very little potential fluctuation as the concentration of the phosphoric acid was varied. The results of these tests are tabulated in Table XII.

TABLE XII

| Acid concentration, percent $H_3PO_4$: | E.M.F. referenced to calomel, in millivolts |
|---|---|
| 85.9 | 80 |
| 96.3 | 100 |
| 115 | 100 |

The results which are set forth in Table XII represent only approximate E.M.F. values obtained for the gold-gold oxide electrode because of the small size of the electrode used. However, the data are considered sufficiently accurate to show that the electrode potential is essentially independent of the concentration of the phosphoric acid electrolyte.

Like the platinum-platinum oxide electrode, the gold-gold oxide electrode was also tested for potential stability over extended periods of time when placed in contact with a chromic acid cleaning mixture. The composition of the mixture was the same as that described above in connection with the description of the platinum-platinum oxide tests. The data obtained in conducting this test are tabulated in Table XIII.

TABLE XIII

| Time, minutes: | E.M.F. referenced to calomel, in millivolts |
|---|---|
| 0 | 1360 |
| 5 | 1380 |
| 20 | 1370 |
| 40 | 1370 |
| 99 | 1370 |
| 253 | 1370 |

It is again apparent that the gold-gold oxide rapidly attains, and then continues to maintain, an excellent stability over extended periods of time.

Another extremely desirable property of the noble metal-noble metal oxide electrodes which should be mentioned is their complete immunity to attack by the corrosive electrolytes which were utilized. No tendency toward solubility in the electrolytes was observed.

In addition to their usefulness in sulfuric acid, phosphoric acid and chromic acid, the noble metal-noble metal oxide electrodes were found to be useful reference electrodes in a system used to protect metallic vessels from corrosive attack by molten salt solutions, and particularly molten acid salts, such as sodium hydrogen sulfate. Since substantially all of the water is normally driven off the salts in the molten state, no problem of variation of electrode potential with electrolyte concentration is encountered in this application.

Because of the high temperatures encountered in the use of anodic polarization systems to protect metals against attack by molten salts, it is not possible to evaluate the stability of the noble metal-noble metal oxide electrodes by comparison with the standard calomel electrode. At the temperatures at which many salts are molten, the salt bridge electrolyte solution would be caused to boil. However, polarization curve and corrosion test data obtained using the platinum-platinum oxide electrode as the reference electrode clearly indicate the suitability of the noble metal-noble metal oxide electrodes for this use. Thus, in FIGURES 34 and 35, the polarization curves for 1020 mild steel and for 304 stainless steel in contact with molten sodium hydrogen sulfate and using a platinum-platinum oxide reference electrode each indicate the existence of a passive potential region of minimum current density.

Table XIV shows the corrosion rates of both unprotected and anodically polarized 1020 mold steel and 304 stainless steel coupons in molten sodium hydrogen sulfate at 420° F. The platinum-platinum oxide electrode was used as the reference electrode in an anodic polarization corrosion control system of the type hereinbefore described and illustrated in FIGURE 1.

for protecting steel vessels against corrosion by molten salts.

One other type of metal-metal oxide electrode was proved by the tests which we have conducted to possess properties indicating its suitability for use as a reference electrode in the anodic polarization corrosion control systems. This was a molybdenum-molybdenum oxide electrode. In the tests of this material, the E.M.F. relationship between the molybdenum-molybdenum oxide electrode and a saturated calomel reference electrode maintained at 25° C. was determined while the molybdenum-molybdenum oxide electrode was in contact with phosphoric acid solutions of different concentrations. As shown by Table XV below, the E.M.F. of this electrode with respect to calomel is suitably independent of the strength of the phosphoric acid solution as the acid concentration is varied from 85 percent to 115 percent.

TABLE XV

| Acid concentration, percent $H_3PO_4$: | E.M.F. referenced to calomel, in millivolts |
|---|---|
| 85.9 | 160 |
| 96.3 | 190 |
| 115.0 | 220 |

The molybdenum-molybdenum oxide electrode was also evaluated for its ability to quickly attain equilibrium and to maintain its stability over an extended period of time. Typical data showing the effect of aging on the potential of the molybdenum-molybdenum oxide electrode are tabulated in Table XVI. The tests were conducted with the electrode in contact with a 115 percent phosphoric acid solution maintained at 25° C.

TABLE XVI

| Time, hours: | E.M.F. referenced to calomel, in millivolts |
|---|---|
| 0 | 190 |
| ½ | 200 |
| 2 | 210 |
| 3 | 220 |
| 4 | 220 |
| 5½ | 220 |
| 22½ | 220 |

As indicated by the data set forth in Table XVI, the molybdenum-molybdenum oxide electrode attains equilibrium rapidly and maintains a relatively constant potential over extended periods of time. In the test of extended stability which was conducted, it was also observed that this electrode is not appreciably attacked by the phosphoric acid solutions ranging in concentration from 86 percent to 115 percent.

TABLE XIV

| | Liquid phase [1] Corrosion rate, m.p.y. | | | Current [3] density, ma./sq. ft. | Percent protection |
|---|---|---|---|---|---|
| Type metal | Unprotected | Anodically polarized | Polarization [2] potential, mv. | | |
| 1020 mild steel | 924 | 4.0 | +600 (Noble) | 5.8 | 99.6 |
| 1020 mild steel | | 2.3 | +750 (Noble) | 4.4 | 99.8 |
| 304 stainless steel | 81 | 5.4 | +750 (Noble) | 9.6 | 93.3 |

[1] Approximately 20-hour tests.
[2] Pt-Pt oxide reference electrode (420° F).
[3] For maintaining polarization near close of test.

In referring to Table XIV, it will be noted that anodic protection reduced the liquid phase corrosion rate of mild steel from 924 to 2.3 milli-inches per year or 99.8 percent, and reduced the corrosion rate of stainless steel from 81 to 5.4 milli-inches per year or 93.3 percent. These results clearly demonstrate the effectiveness of the noble metal-noble metal oxide electrodes as reference electrodes for use in anodic polarization corrosion control systems A chromium-chromium oxide electrode was found to be very useful in caustic solutions. Table XVII shows the stability of the chromium-chromium oxide electrode in 50% sodium hydroxide solution when the solution was heated to 100° C. It should also be noted that the chromium-chromium oxide was not visibly attacked by this concentrated sodium hydroxide solution, even at the elevated temperature.

TABLE XVII.—EFFECT OF TEMPERATURE ON E.M.F. OF CHROMIUM-CHROMIUM OXIDE

| Temperature, °C. | E.M.F., mv.[1] | Time, hours |
|---|---|---|
| 23 | [2]+545 | 11 |
| 23 | +520 | 23 |
| 30 | +525 | 31 |
| 40 | +530 | 23½ |
| 50 | +540 | 23½ |
| 60 | +550 | 23½ |
| 70 | +570 | 23½ |
| 80 | +600 | 23⅜ |
| 90 | +635 | 23¾ |
| 100 | +690 | 24 |
| 27 | +540 | 27½ |

[1] To saturated calomel at approximately 25° C.
[2] Active.

A tungsten-tungsten oxide electrode was tested in a 50% sodium hydroxide solution and the temperature was varied over a period of time. The results are shown in Table XVIII.

TABLE XVIII.—EFFECT OF TEMPERATURE ON E.M.F. OF TUNGSTEN-TUNGSTEN OXIDE ELECTRODE IN 50 PERCENT CAUSTIC

| Temperature, °C. | E.M.F., mv.[1] | Time, hours |
|---|---|---|
| 135 | [2]−1,120 | 0 |
| 130 | −1,120 | |
| 115 | −1,140 | |
| 110 | −1,125 | |
| 105 | −1,125 | |
| 100 | −1,125 | |
| 90 | −1,120 | |
| 80 | −1,125 | |
| 70 | −1,100 | |
| 60 | −1,100 | |
| 50 | −1,100 | |
| 45 | −1,040 | |
| 40 | −1,010 | |
| 27 | −1,020 | 3½ |
| 27 | −950 | 45 |

[1] To saturated calomel at approximately 25° C.
[2] Active.

These data show: (1) the E.M.F. was essentially constant at minus 1120 millivolts (noble) throughout the temperature range 50 to 135° C.; (2) the E.M.F. varied slightly at 27° C. (minus 950 to minus 1020 millivolts); and (3) the E.M.F. shifted only to minus 1120 millivolts as the temperature was increased from 27° C. to 50° C.; thus, the electrode E.M.F. is reasonably stable at room temperature, shifts only slightly as the temperature is increased and is essentially constant over a wide range of elevated temperatures.

A hafium-hafium oxide electrode was tested in a 50% sodium hydroxide solution, over a temperature range of 25 to 80° C., and found to perform in a very satisfactory manner.

A tantalum-tantalum oxide electrode was tested in a 50% sodium hydroxide solution over a temperature range varying from 25 to 95° C. and found to be a suitable reference electrode.

A nickel-nickel oxide electrode is a reference electrode suitable for use in strong caustic solution.

From the foregoing working examples, it will be perceived that we have extensively tested and evaluated a great number of materials to determine their suitability for use as reference electrodes. While these tests and evaluations have been directed primarily to the determination of materials which possess properties which endow them with superior attributes when utilizes as reference electrodes in anodic polarization corrosion control systems, it will be apparent that many of the same properties which characterize reference electrodes in such corrosion control applications, also must characterize any reference electrode when employed in an application or use which requires it to be placed in contact with a corrosive electrolyte. The solid nature of many of the materials which have proved suitable for such use enables them to be usefully employed in applications where substantial mechanical strength and ease of installation are important factors. Moreover, the excellent temperature and concentration stability of most of the electrodes discussed hereinbefore indicates that they possess the properties which are most essential in various analytical techniques where a reference electrode of constant potential is required.

Many of the electrode materials which were tested, and which were believed to be sufficiently good materials for use as reference electrodes, appeared to retain their attractive properties in both acidic and basic electrolytes of varying types and concentrations. Others of the electrodes show definitely better stability in some of the electrolytes than in others. In the relatively few instances where the materials do not exhibit a constant potential over the entire concentration range of electrolytes in which they were tested, the very good stability of these electrodes within certain specific ranges may be advantageously utilized in corrosion control situations where the range over which the corrosive electrolyte concentration may vary is known in advance. It is believed that the preferred application of the several electrodes will be manifest from the foregoing description of the invention, and that it is unnecessary to here summarize the properties of the several electrodes which may make one electrode or one group of electrodes preferable for use in certain electrolytes, or in certain concentrations of electrolytes, and other electrodes or groups of electrodes preferable for general and widespread usage where the concentrations, temperatures and chemical constitution of the electrolytes are not known with certainty in advance of the installation of the corrosion control system.

Although it is not our contention that every one of the materials which are tested and evaluated in the manner set forth above has heretofore been totally unknown as an electrode material, we do believe that in every instance except that the mercury-mercurous sulfate electrode, we have for the first time determined that these materials possess properties making them suitable, and in some cases nearly ideal, for general usage as reference electrodes. Some of the electrode materials, namely the platinum-platinum oxide and the rhodium-rhodium oxide electrodes, we believe to be entirely novel and to be here disclosed for the first time. We also claim to be the first to use the process of producing these particular electrodes.

Although a wide variety of applications and usages of the electrode materials which we have for the first time evaluated for use as reference electrodes will occur to electrochemists and others skilled in the art, it is our intention that the novel principles and concepts herein disclosed shall be the criteria establishing the bounds and limits of the present invention. Insofar as minor modifications and innovations are evolved by those skilled in the art for making further use of the novel principles and concepts herein disclosed, it is our intention that such modifications and innovations be considered to fall within the spirit and scope of this invention except insofar as the same may be necessarily limited by the appended claims or reasonable equivalents thereof.

We claim:

1. In a method for controlling the rate of corrosion of a metallic container by a corrosive electrolyte contained therein by making the container an anode with respect to an inert cathode contained therein and passing an electrical current between the container and said cathode to vary the passivity of said container, the improvement which comprises measuring the passivity of said container by:

(a) placing a reference electrode in direct contact with the electrolytic solution while said solution is in contact with said metal, said reference electrode being selected from the group consisting of a molybdenum-molybdenum oxide electrode, a hafium-hafium oxide electrode, a scandium-scandium oxide electrode, a manganese-manganese oxide electrode, a cobalt-cobalt oxide electrode, a nickel-nickel oxide electrode, a chromium-chromium oxide electrode, a tungsten-tungsten oxide electrode, a tantalum-tantalum oxide electrode, a niobium-niobium oxide electrode, a zirconium-zirconium oxide electrode, a palladium-palladium oxide electrode, a tungsten-carbide electrode, a tungsten electrode, a zirconium-tungsten alloy electrode, a carbon electrode, a molybdenum electrode, and a niobium electrode;

(b) measuring the potential difference between said reference electrode and said metal; and (c) determining, responsive to said measuring, the susceptibility to corrosion of said meal;

and controlling the amount of said current passed between said container and said cathode according to the container's susceptibility to corrosion.

2. The method of claim 1 wherein said corrosive electrolyte is selected from the group consisting of corrosive acids and bases.

References Cited

UNITED STATES PATENTS

| | | | |
|---|---|---|---|
| 1,917,991 | 7/1933 | McCullough | 117—231 |
| 2,079,840 | 5/1937 | Byrkit | 204—56 |
| 3,141,835 | 7/1964 | Rolin et al. | 204—195 |
| 3,141,840 | 7/1964 | Melse et al. | 204—220 |
| 3,208,925 | 9/1965 | Hutchison et al. | 204—147 |
| 3,208,928 | 11/1965 | Landers et al. | 204—196 |
| 3,216,916 | 11/1965 | Locke | 204—196 |
| 3,345,278 | 10/1967 | Mekjean | 204—196 |

OTHER REFERENCES

Ives et al.: "Reference Electrodes," 1961, pp. 110, 157, 158, 330, 331, 335, 336, and 356–359.

Ferguson et al.: "JACS," vol. 43, 1921, pp. 2150–2151.

Tartar et al.: "JACS," vol. 63, 1941, pp. 28 and 29.

De Vries et al.: "JACS," vol. 71, 1949, pp. 1114 and 1115.

HOWARD S. WILLIAMS, Primary Examiner

T. TUNG, Assistant Examiner

U.S. Cl. X.R.

204—1, 56, 195, 196, 290, 291, 292, 293